(12) United States Patent
Dillard et al.

(10) Patent No.: US 9,811,788 B2
(45) Date of Patent: Nov. 7, 2017

(54) FOOD SAFETY MANAGEMENT SYSTEM

(75) Inventors: Douglas Brown Dillard, Athens, GA (US); Robert Bradford Gray, Athens, GA (US); David Alan Spencer, Culpeper, VA (US); John Ashwell Raymond, Athens, GA (US)

(73) Assignee: CM SYSTEMS, LLC, Lawrenceville, GA (US)

( * ) Notice: Subject to any disclaimer, the term of this patent is extended or adjusted under 35 U.S.C. 154(b) by 1410 days.

(21) Appl. No.: 12/496,004

(22) Filed: Jul. 1, 2009

(65) Prior Publication Data

US 2011/0004502 A1 Jan. 6, 2011

(51) Int. Cl.
G06Q 10/06 (2012.01)
G06Q 30/02 (2012.01)
G06Q 50/12 (2012.01)

(52) U.S. Cl.
CPC ......... G06Q 10/06 (2013.01); G06Q 30/0205 (2013.01); G06Q 50/12 (2013.01)

(58) Field of Classification Search
None
See application file for complete search history.

(56) References Cited

U.S. PATENT DOCUMENTS

| 3,959,787 | A | | 5/1976 | Messmann et al. |
| 5,410,141 | A | * | 4/1995 | Koenck et al. ......... 235/472.02 |
| 5,900,801 | A | | 5/1999 | Heagle et al. |
| 5,939,974 | A | | 8/1999 | Heagle et al. |
| 6,058,356 | A | * | 5/2000 | Swanson et al. ........... 702/99 |
| 6,133,555 | A | * | 10/2000 | Brenn ........................ 219/497 |
| 6,144,848 | A | | 11/2000 | Walsh et al. |
| 6,411,916 | B1 | * | 6/2002 | Pellerin ...................... 702/130 |
| 6,577,969 | B2 | | 6/2003 | Takeda et al. |
| 6,725,180 | B2 | | 4/2004 | Mayer et al. |
| 6,811,305 | B2 | | 11/2004 | Laycock |
| 6,817,757 | B1 | | 11/2004 | Wallace |
| 6,856,247 | B1 | | 2/2005 | Wallace |
| 6,856,932 | B1 | | 2/2005 | Wallace |
| 7,019,638 | B1 | | 3/2006 | Wallace |
| 7,026,929 | B1 | | 4/2006 | Wallace |
| 7,153,470 | B2 | | 12/2006 | Stockard |

(Continued)

OTHER PUBLICATIONS

International Search Report and Written Opinion dated Sep. 20, 2010.

(Continued)

Primary Examiner — Thomas L Mansfield, Jr.
(74) Attorney, Agent, or Firm — Thomas | Horstemeyer, LLP

(57) ABSTRACT

Disclosed are various embodiments of a food safety management system, including a web portal for management and reporting and a handheld computing device for checklist completion. A checklist of tasks to be performed in a food service establishment is obtained and displayed on a touchscreen of the handheld computing device. Confirmation is obtained on the touchscreen whether a task has been completed. An identifier at a location in the food service establishment is inputted to verify that a task has been completed. Temperature and humidity readings are obtained from one or more stationary sensors monitoring a food storage environment. Task completion data, temperature data, and humidity data are sent to a server.

20 Claims, 15 Drawing Sheets

(56) References Cited

U.S. PATENT DOCUMENTS

| | | | |
|---|---|---|---|
| 8,101,892 B2* | 1/2012 | Kates | 219/494 |
| 8,276,505 B2* | 10/2012 | Buehler | 99/326 |
| 2002/0116155 A1 | 8/2002 | Mayer et al. | |
| 2002/0163436 A1* | 11/2002 | Singh et al. | 340/584 |
| 2003/0152679 A1* | 8/2003 | Garwood | 426/392 |
| 2004/0100380 A1* | 5/2004 | Lindsay et al. | 340/540 |
| 2004/0103043 A1 | 5/2004 | Reade et al. | |
| 2004/0161016 A1 | 8/2004 | Laycock | |
| 2004/0226392 A1* | 11/2004 | McNally | 73/866.1 |
| 2005/0222778 A1 | 10/2005 | Levinson et al. | |
| 2005/0251450 A1* | 11/2005 | Koether et al. | 705/15 |
| 2006/0149642 A1* | 7/2006 | Dillard et al. | 705/26 |
| 2006/0213904 A1* | 9/2006 | Kates | 219/702 |
| 2006/0259471 A1 | 11/2006 | Droubie et al. | |
| 2007/0043478 A1 | 2/2007 | Ehlers et al. | |
| 2007/0085759 A1 | 4/2007 | Lee et al. | |
| 2007/0162858 A1 | 7/2007 | Hurley et al. | |
| 2007/0220907 A1 | 9/2007 | Ehlers | |
| 2007/0264864 A1 | 11/2007 | Andre et al. | |
| 2008/0103723 A1 | 5/2008 | Burdett et al. | |
| 2008/0120188 A1* | 5/2008 | Mobley et al. | 705/15 |
| 2008/0162352 A1 | 7/2008 | Gizewski | |

OTHER PUBLICATIONS

John Surak and Jeffery L. Cawley, Moving From Paper to Electronic HACCP Records, Food Safety Magazine, Feb./Mar. 2009, available at http://www.foodsafetymagazine.com/article.asp?id=2799&sub=sub1.

Integrated Control Corp., Product Information, Apr. 6, 2009, available at http://www.goicc.com/iccproductinfo.html.

* cited by examiner

FOOD SAFETY MANAGEMENT SYSTEM

BACKGROUND

Hazard Analysis and Critical Control Points (HACCP) is a systematic preventative approach to food safety for the food preparation industry. HACCP programs are used to identify potential food safety hazards so that actions may be taken to avoid them. HACCP programs typically use paper-based checklists to gather and manage data. However, paper-based HACCP programs have many disadvantages, including transcription errors, labor-intensive operations, difficult and time-consuming record retrieval and reporting, and costly record storage.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The food safety management system described herein provides the ability to implement a HACCP program for compliance with food safety regulations across multiple food service establishments such as restaurants, eateries, commercial and institutional kitchens, and other food service establishments. The system replaces conventional pen-and-paper checklists and automates data gathering. While pen-and-paper checklists often show perfect readings and compliance, the system herein may enhance personnel accountability by automatically recording the checklist responses, whether or not the responses are compliant. In addition to checklists related to food safety, the system may provide other checklists involving, for example, inventory management and other procedures.

The system also aggregates the gathered data from multiple food service establishments. The system may provide real-time reporting, alert notification, and centralized analysis tools, thereby enabling management to track compliance with various requirements across the multiple food service establishments. By collecting temperature, humidity, and other readings, the system may assist in identifying cooling and other equipment failures before food losses are incurred. In the following discussion, a general description of the system and its components is provided, followed by a discussion of the operation of the same.

Figure 1:
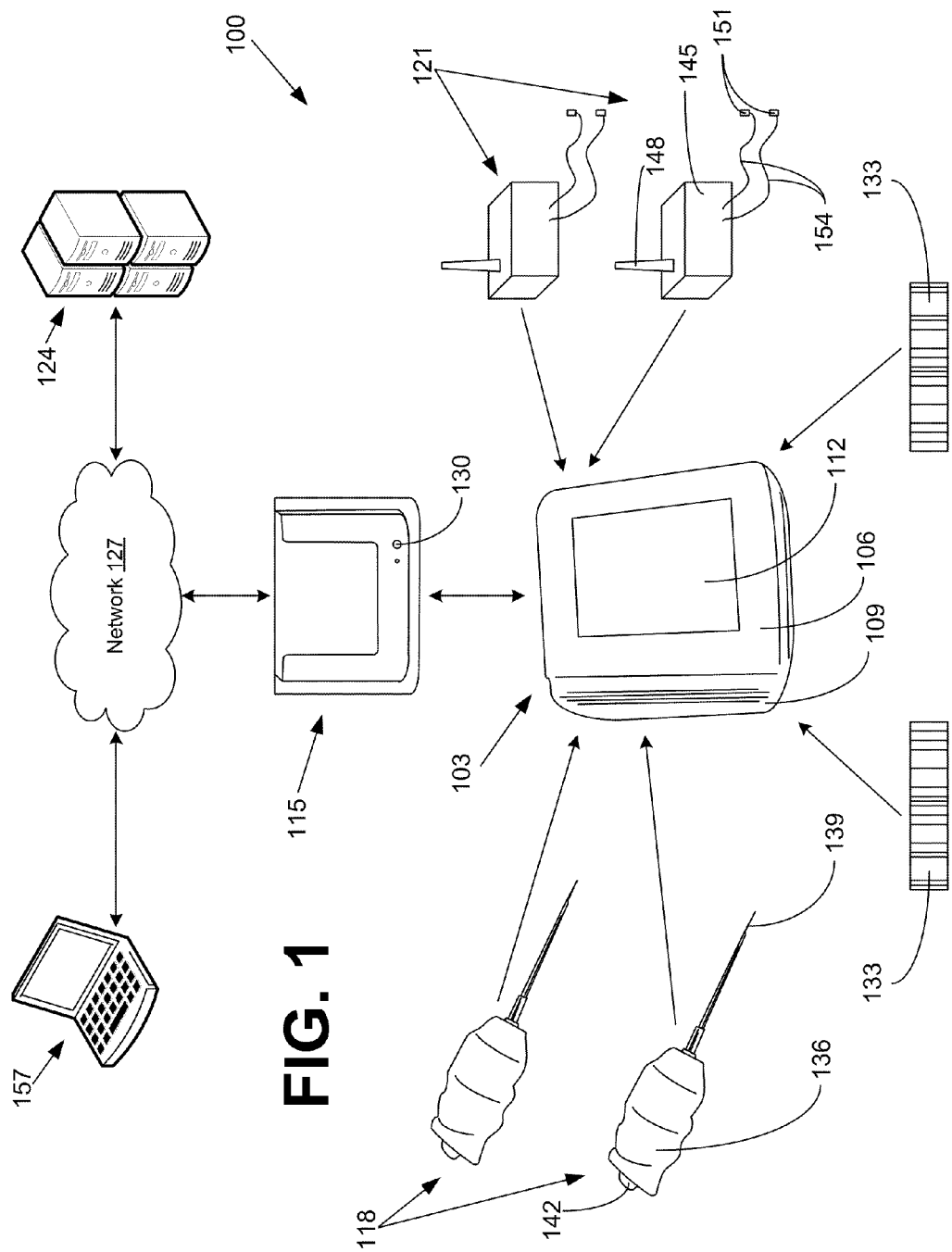
FIG. 1 is a drawing of the components of a food safety management system according to various embodiments of the present disclosure.

With reference to FIG. 1, shown is an illustration of the components of a food safety management system 100 according to various embodiments. Each food service establishment has at least one handheld computing device 103. A handheld computing device 103 is a computer system including at least one processor and a memory. The handheld computing device 103 may include a personal digital assistant, a cell phone, a laptop, or some other type of handheld computing device.

In the illustrated embodiment, the handheld computing device 103 includes a body portion 106, a handle portion 109, and a touchscreen 112. The handle portion 109 adjoins one side of the body portion 106 and enables the handheld computing device 103 to be held by one hand of the user, thereby freeing the other hand for providing input to the touchscreen 112. The touchscreen 112 may include a liquid crystal display (LCD), a plasma display, or other types of flat-panel touchscreen displays. In various embodiments, the orientation of what is displayed by the touchscreen 112 may vary based on how the handheld computing device 103 is held. For example, when the handheld computing device 103 is held in the left hand so that the right hand may be used for input, the touchscreen 112 may display a graphical interface at a first orientation. However, when the handheld computing device 103 is held in the right hand so that the left hand may be used for input, the touchscreen 112 may display the graphical interface at a second orientation that is the first orientation rotated by 90, 180, or 270 degrees.

The handheld computing device 103 may be battery powered in various embodiments. When the handheld computing device 103 is powered by rechargeable batteries, the handheld computing device 103 may be stored and recharged by way of a docking station 115. To this end, the handheld computing device 103 may include one or more connectors designed to transfer power and/or data between the handheld computing device 103 and the docking station 115. Alternatively, or additionally, the handheld computing device 103 may include a power connector configured to connect to a main power adapter and/or may be powered by replaceable batteries.

The handheld computing device 103 is purposefully simple and durable to withstand the harsh environment of a food service establishment or food preparation area. In one embodiment, the handheld computing device 103 includes no movable buttons, and the touchscreen 112 may be the primary method for user input in such an embodiment. Further, as the embodiment does not include a power, or on/off, button, a user may manage the power state of the handheld computing device 103 by touching the touchscreen 112. Also, for example, the handheld computing device 103 may power on when removed from the docking station 115 and may power off when returned to the docking station 115. In other embodiments, the handheld computing device 103 may include movable buttons such as a power button or other buttons for a user to manage power state of the handheld computing device 103.

The handheld computing device 103 may be in data communication with one or more handheld temperature sensors 118, one or more stationary sensors 121, one or more docking stations 115, one or more servers 124, and/or other devices. The handheld computing device 103 may communicate with such devices by wired and/or wireless communication. To this end, the handheld computing device 103 may include a wireless transceiver designed to transmit and/or receive data from various devices wirelessly. Such technology may use, for example, infrared, optical, radio-frequency or other wireless technology. In one embodiment, the handheld computing device 103 communicates with the handheld temperature sensors 118 and the stationary sensors 121 by a Part 15 900 MHz wireless link.

In one embodiment, the handheld computing device 103 communicates with the servers 124 by way of a network 127. The network 127 includes, for example, the Internet, intranets, extranets, wide area networks (WANs), local area networks (LANs), wired networks, wireless networks, cellular networks, or other suitable networks, etc., or any combination of two or more such networks. In another embodiment, only the docking station 115 communicates with the servers 124 over the network 127 and functions to relay data provided to the docking station 115 by the handheld computing device 103 to the servers 124 and vice-versa. In such a case, the docking station 115 may incorporate a button 130 to commence data communication.

The handheld computing device 103 may include an identifier input device configured to input identifiers 133. Identifiers 133 may include, for example, barcodes, radio-frequency identifiers (RFIDs), character strings, pictures, and/or other types of identifiers for a physical location. Thus, such an identifier input device may include a barcode scanner, an RFID detector, a charge-coupled device (CCD) for digital imaging, and/or other types of devices configured to input identifiers 133. In one embodiment, handheld computing device 103 may incorporate image recognition logic to identify a location based on a photo of the location. The identifiers 133 may be deployed in various locations in the food service establishment, for example, in restrooms, dining rooms, cleaning areas, etc.

In various embodiments, the handheld temperature sensors 118 each include a handle portion 136, a probe portion 139, and a trigger button 142. The handle portion 136 may be constructed of a material such as, but not limited to plastic and/or rubber, and may be configured ergonomically to conform to the grip of the hand of a user. The probe portion 139, as a non-limiting example, may be constructed of metal. The probe portion 139 may have an elongated shape with a pointed end configured to reach into food items, including items to be eaten and items to be used in food preparation, in order to take temperature readings of the food items. The trigger button 142 may be depressed in order to trigger a temperature reading and transmit a signal to the handheld computing device 103. The signal, for example, may include a data representation of the temperature that is sent wirelessly or by wired connection to the handheld computing device 103. As another example, the signal may include an analog signal corresponding to the temperature reading.

In various embodiments, the stationary sensors 121 each include a base unit 145, an antenna 148, and one or more sensors 151 connected to the base unit 145 by one or more leads 154. In other embodiments, the stationary sensors 121 may include the one or more sensors 151 within the base unit 145. In various embodiments, the stationary sensors 121 may be capable of measuring temperature, humidity, and/or other conditions. The stationary sensors 121 may be deployed in a food service establishment to measure ambient conditions in a kitchen, dining room, or other area, or conditions within a specific food storage or preparation environment such as a freezer or refrigerator.

Figure 2:
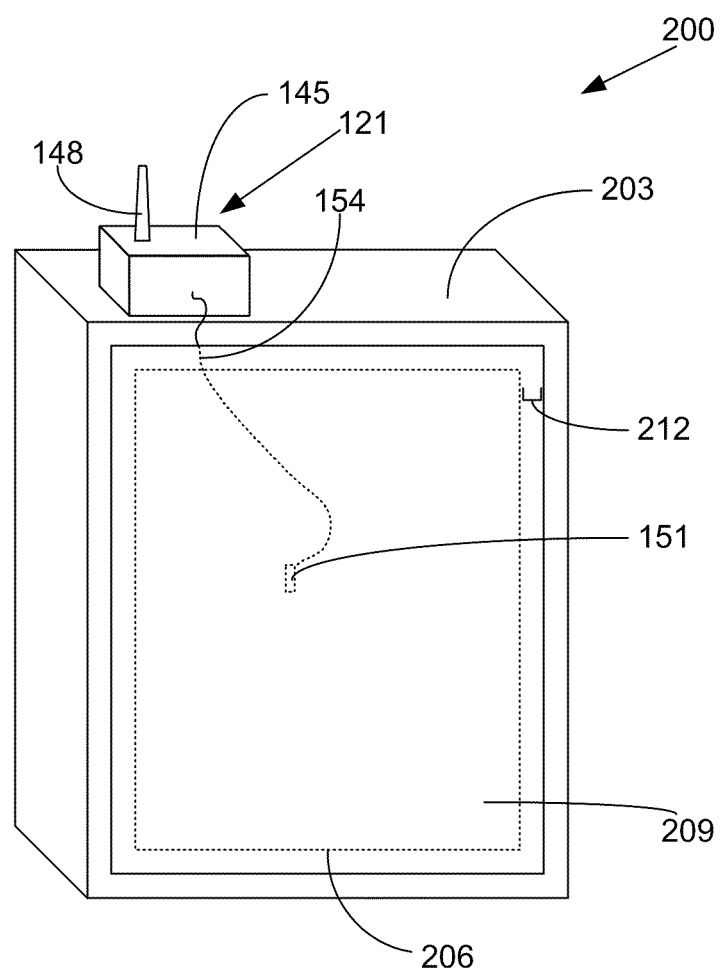
FIG. 2 is a drawing of an example of a stationary sensor of the food safety management system of FIG. 1 that is deployed in a sealed food storage environment according to one embodiment of the present disclosure.

Referring now to FIG. 2, shown is an example of one embodiment of a stationary sensor 121 (FIG. 1) that is deployed in a sealed food storage environment 200. The sealed food storage environment 200, as non-limiting examples, may be a freezer, refrigerator, walk-in cooler, and/or other controlled-climate environments. In the illustrated embodiment, sealed food storage environment 200 includes a cabinet 203 having an opening 206, a door 209 configured to cover and overlap the opening 206, and a door gasket 212 attached to the door 209 and configured to seal the door 209 to the cabinet 203, thereby sealing the opening 206. The door gasket 212, as a non-limiting example, may be made of rubber or other flexible material.

The base unit 145 (FIG. 1) of the stationary sensor 121 may be located on, adjacent to, or near the sealed food storage environment 200 such that the length of the leads 154 (FIG. 1) permit the sensors 151 (FIG. 1) to send a signal that will be received by the base unit 145. In other embodiments, the sensors 151 inside the food storage environment 200 may generate a wireless signal that is received by the base unit 145, or the sensors 151 may be in wired or wireless communication with the handheld computing device 103 (FIG. 1) or docking station 115 (FIG. 1) directly. In other embodiments, the stationary sensor 121 may be located entirely within a sealed food storage environment 200. However, in some embodiments, it may be necessary to use leads 154 to send the signal outside of the sealed food storage environment 200 because the sealed food storage environment 200 may be of a construction (e.g., metal) that interferes with wireless signal transmission (e.g., like a Faraday cage).

Typically, the door gasket 212 may seal to the cabinet 203 only when the mating surface of the cabinet 203 is substantially flat. In one embodiment, the leads 154 may be taped (e.g., using foil tape) to the cabinet 203 so as to smooth out the surface to which the door gasket 212 is to adhere. However, in another embodiment, leads 154 include a ribbon-type of wire that is substantially flat and will not interfere with the sealing of the door gasket 212 surface to the cabinet 203 surface. Thus, the leads 154 may be substantially flat so as to permit the surface of the door gasket 212 to seal against the leads 154 and a surface of the cabinet 203 without an air gap. Such a wire may include a commercially available flat wire product such as, for example, from FlatWire TV$^{SM}$, Inc.

Referring back to FIG. 1, the server 124 may include, for example, a server computer or like system. The server 124 may represent multiple servers arranged, for example, in one or more server banks or other arrangements. Such servers 124 may be located in a single installation or may be dispersed among many different geographical locations. For purposes of convenience, the server 124 is referred to herein in the singular. However, in one embodiment, the server 124 represents a plurality of servers arranged as described above.

The server 124 may be in data communication with one or more clients 157 by way of the network 127. The client 157 may include, for example, a computer system such as a desktop, laptop, or other computer system. The client 157 may also include personal digital assistants, cellular telephones, set-top boxes, or other systems with like capability. Further, the client 157 may also include any device that is network capable that may communicate with the server 124 over the network 127 to perform various functions. Such clients 157 may include, for example, processor-based devices having processor circuits including a processor and a memory.

Figure 3:
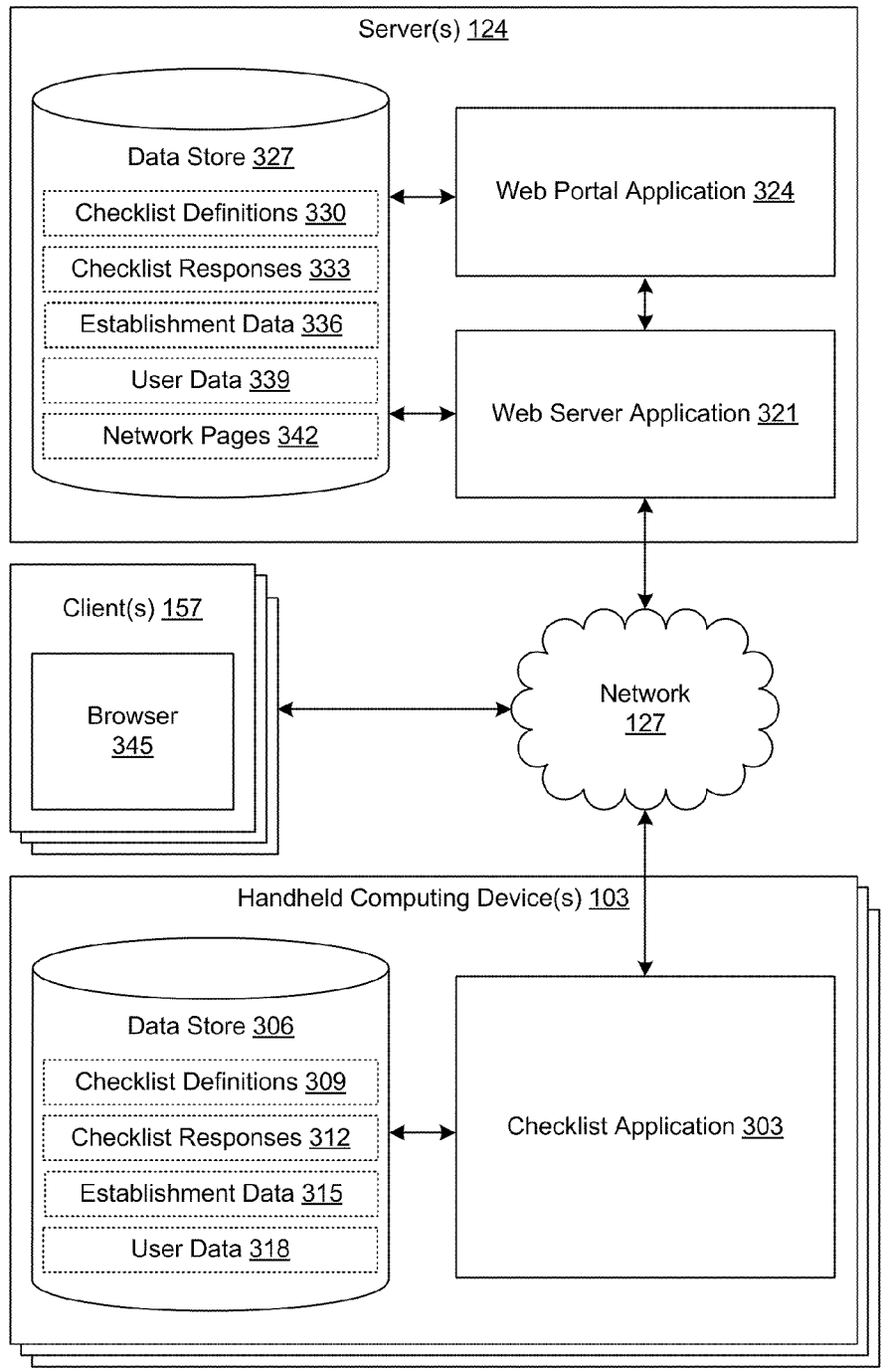
FIG. 3 is a detailed view of portions of the food safety management system of FIG. 1 according to various embodiments of the present disclosure.

With reference now to FIG. 3, shown is a detailed view of portions of the food safety management system 100 (FIG. 1). The handheld computing device 103 (FIG. 1) is configured to execute various applications such as, for example, a checklist application 303 and other applications. Also, the handheld computing device 103 includes a data store 306 and potentially other data stores, which may include data and applications operable to provide access to the data. The data store 306 may be used to store data including checklist definitions 309, checklist responses 312, establishment data 315, user data 318, and potentially other data. Checklist definitions 309 include definitions of checklists to be performed by an employee in a particular food service establishment. Checklist responses 312 include the responses of the employee to the checklist when the checklist is performed as well as the data in performing the checklist, e.g., temperature or other readings from handheld temperature sensors 118 (FIG. 1), stationary sensors 121 (FIG. 1), etc. Establishment data 315 includes other data relating to a specific food service establishment. User data 318 includes configuration settings for various users of the handheld computing device 103 such as, for example, language preferences, left or right hand preferences, etc.

The server 124 (FIG. 1) is configured to execute various applications such as, for example, a web server application 321, a web portal application 324, and other applications. The web server application 321 is configured to serve up network pages such as, for example, web pages to clients 157 (FIG. 1) over the network 127. The web server application 321 may use a protocol such as, for example, hypertext transfer protocol (HTTP), user datagram protocol (UDP), etc. The web portal application 324 is configured to generate network pages functioning as an administration and monitoring interface for a plurality of food service establishments. To this end, the web portal application 324 may be a standalone application working in conjunction with the web server application 321 or may include a plurality of server-side scripts executed in response to user requests by the web server application 321.

The server 124 also includes a data store 327 and potentially other data stores, which may include data and applications operable to provide access to the data. The data store 327 may be used to store data including checklist definitions 330, checklist responses 333, establishment data 336, user data 339, network pages 342, and potentially other data. Checklist definitions 330 include definitions for checklists to be used in a plurality of food service establishments. Checklist responses 333 include the responses to the checklists used in the plurality of food service establishments. Establishment data 336 includes data related to the plurality of food service establishments such as, for example, location of the food service establishments. User data 339 includes privileges and preferences for the management users of the web portal application 324. Network pages 342 include all static and dynamic network pages used by the web portal application 324 and served up by the web server application 321.

The clients 157 may be configured to execute various applications such as a browser 345 and/or other applications. The browser 345 may be executed in a client 157, for example, to access and render network pages, such as web pages, or other network content served up by the server 124 and/or other servers.

Next, a general description of the operation of the various components of the food safety management system 100 is provided. To begin with, a user at a client 157 provides to the web portal application 324 establishment data 336 for a plurality of food service establishments and checklist definitions 330 for those establishments. Each checklist may include a plurality of tasks to be performed at the food service establishments. Further, a checklist may include nested checklists. Some of the checklists may be designed for completion at different intervals such as different times of the day, different days of the week, different days of the month, etc.

As non-limiting examples, checklists may relate to opening, closing, food safety, restroom checks, refrigeration monitoring, ambient monitoring, produce ordering, and other checklists intended for a food service environment. Specific tasks may include, as non-limiting examples, "yes" or "no" tasks such as verifying that soap is in a restroom soap dispenser, verifying that the front of the building is clean of debris and that the sidewalk has been swept; manual monitoring tasks such as taking a temperature reading of a food item or food preparation item by way of a handheld temperature sensor 118; automatic monitoring tasks such as automatic collection of temperature, humidity, effective cooling, or other readings from stationary sensors 121; and other tasks. In some embodiments, the stationary sensors 121 may be configured to send data automatically to server 124 over the network 127, bypassing the handheld computing device 103 and/or the docking station 115.

Where stationary sensors 121 are equipped to provide temperature and humidity readings for food storage or food preparation environment, the checklist application 303 or web portal application 324 may provide an effective cooling quotient based upon the readings. It has been observed that humidity has a significant impact on effective cooling in an environment such as a refrigerator. Although the evaporator coil removes moisture in the air, it may not remove a desired amount. To this end, as a non-limiting example, a desiccant may be used within the environment to remove additional moisture. The desiccant also may be of a type such that it releases moisture when the humidity is below a desired amount. To more easily present to a user the relationship of temperature and humidity to effective cooling, the effective cooling quotient may be generated. Additionally, the effective cooling quotient may take into account multiple temperature and/or humidity readings from within the environment.

As a non-limiting example, an effective cooling quotient may be calculated according to the following formula: $T \times H + M$, where T is the temperature within the environment, H is the ambient humidity within the environment, and M is additional moisture, which may be zero, positive, or negative. Each of the factors may be weighted as desired. It is understood that many different formulas incorporating temperature and humidity may be employed in order to calculate an effective cooling quotient.

Figure 4:
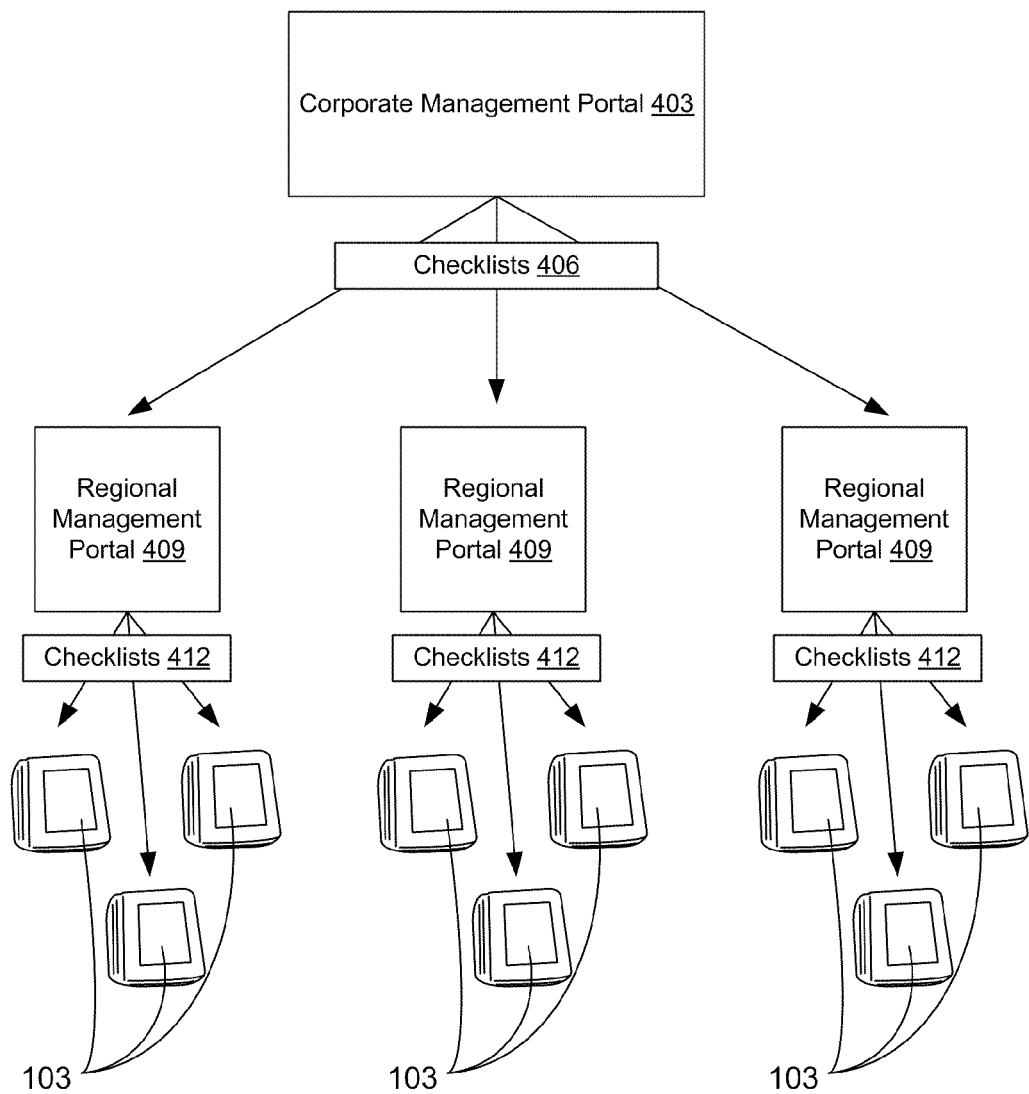
FIG. 4 is a diagram illustrating one embodiment of the present disclosure for generating, modifying, and distributing checklists in the food safety management system of FIG. 1.

Moving now to FIG. 4, illustrated is one embodiment for generating, modifying, and distributing checklists. A corporate management user for a plurality of food service establishments may access a corporate management portal 403 through the web portal application 324 (FIG. 3). In some embodiments, the corporate management portal 403 is the same application as the web portal application 324 but with behavior specific to corporate management users, or "super users," configured in user data 339 (FIG. 3). In other embodiments, the corporate management portal 403 includes an entirely separate application executed on different servers 124 (FIG. 1).

Through the corporate management portal 403, the corporate management user is able to configure checklists for all of the food service establishments across a chain or other grouping. Thus, checklists may be generated and customized. In one embodiment, the corporate management portal 403 may provide for the creation of master checklists 406 that are distributed to all of the food service establishments.

The master checklists 406 may be further configured at each of a plurality of regional management portals 409. The regional management portals 409 may be the same application as the web portal application 324 but with behavior specific to regional management users configured in user data 339. In other embodiments, the regional management portals 409 are instances of an entirely separate application or applications executed on different servers 124. Although three regional management portals 409 are illustrated, it is understood that there may be any number of regional management portals 409. Furthermore, there may be any number of subregional levels for regional management portals 409. For example, there may be a regional management portal 409 for a state and then a dozen regional management portals 409 nested under the state level for specific markets within the state.

The regional management portals 409 enable a regional management user to further configure the master checklists 406 for one or more food service establishments. For example, a regional management user might decide to change a particular task or configure a temperature reading limit to enable compliance with the health codes of a particular state. Such changes will be reflected in customized checklists 412 distributed to handheld computing devices 103 (FIG. 1) at the regional subset of the food service establishments supervised by the regional management user through the particular regional management portal 409. In some embodiments, the customized checklists 412 may be further customized through additional levels of subregional portals or at the food service establishments themselves.

Referring back to FIGS. 1 and 3, after being generated, and in some cases customized, a checklist is sent from the web portal application 324 on the server 124 to the checklist application 303 on the handheld computing device 103 at the respective food service establishment by way of the network 127. The checklist distribution may be performed either in a push or pull configuration. For example, the checklist application 303 may poll the server 124 for an updated checklist at regular intervals or when other data is being sent to the server 124. Alternatively, the checklist application 303 may receive an updated checklist from the server 124 automatically after the updated checklist is generated.

In some embodiments, the handheld computing device 103 communicates directly with the server 124 over the network 127. In other embodiments, the handheld computing device 103 may send and receive data when docked at the docking station 115. The handheld computing device 103 may, in various embodiments, receive temperature and/or other readings from stationary sensors 121 and submit corresponding data to the server 124 automatically while the handheld computing device 103 is docked at the docking station 115. The handheld computing device 103 stores the obtained checklists and other data in checklist definitions 309, establishment data 315, and possibly in other locations.

Figure 5:
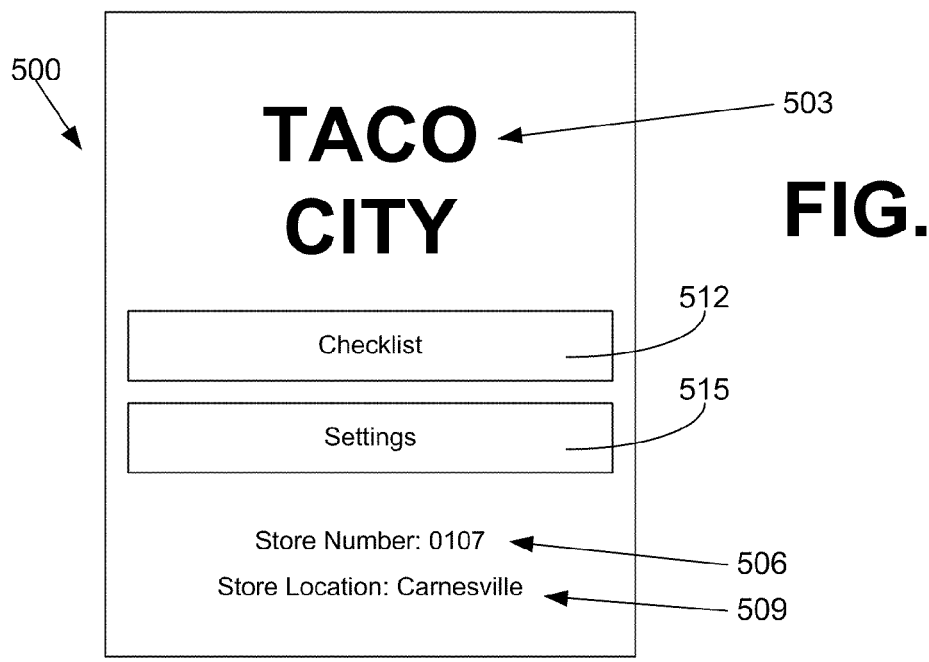
FIGS. 5-12 are examples of user interface screens displayed on a touchscreen of the handheld computing device used in the food safety management system of FIG. 1 according to various embodiments of the present disclosure.

Turning now to FIGS. 5-12, shown are examples of user interface screens displayed on touchscreen 112 (FIG. 1) according to various embodiments of the handheld computing device 103 (FIG. 1). To begin, an employee user at the food service location retrieves the handheld computing device 103 from its docking station 115 (FIG. 1) and begins interacting with the checklist application 303 (FIG. 3) on the handheld computing device 103. FIG. 5 depicts one example of an initial screen 500 displayed by the touchscreen 112. The initial screen 500 may display a logo 503 for the group or chain of food service locations. Additionally, the initial screen 500 may display information such as, as non-limiting examples, the store number 506 and/or store location 509.

Also displayed are checklist button 512 and settings button 515. In other embodiments, an order entry button may be displayed to enter food orders. Other buttons may also appear corresponding to different functions. In other embodiments, the checklist button 512 may not appear if the checklist function is disabled. In some embodiments, the employee user may be required to log in (e.g., with a username and password) so that the checklist application 303 can determine (e.g., from user data 318 (FIG. 3)) which checklist(s) and task(s) the employee user is to perform. In this way, stored preferences can be associated with each employee user. In some embodiments, the user log-in screen is provided when the handheld computing device 103 is first removed from its docking station 115. Users may be logged out automatically when, for example, the handheld computing device 103 is returned to its docking station 115. Responsive to selection of the settings button 515, the checklist application 303 may present screens allowing users to specify, for example, a preferred language (e.g., English or Spanish) and/or orientation for the touchscreen 112 (e.g., right- or left-handed screen orientation relative to the handle portion 109 (FIG. 1)). After various settings have been identified, the checklist application 303 may automatically adjust what is displayed on the touchscreen 112 of the handheld computing device 103.

Figure 6:
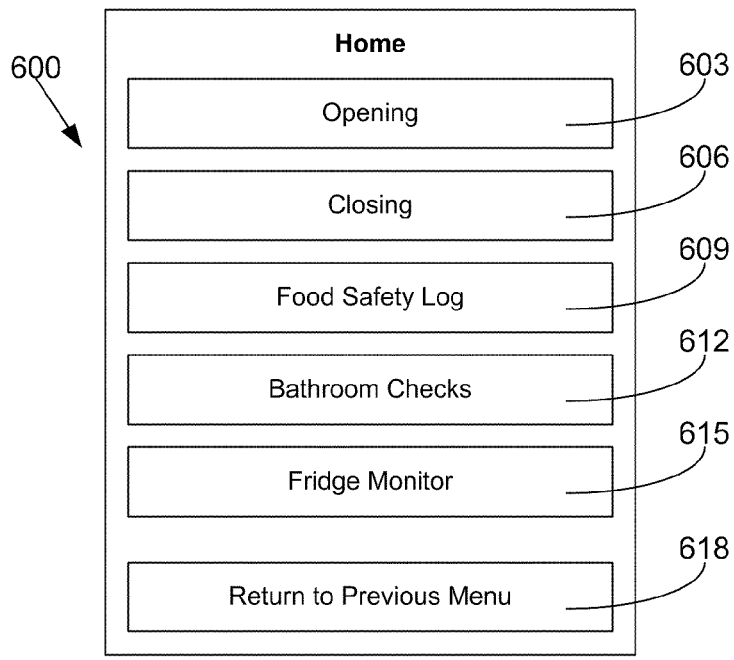

FIG. 6 depicts one example of a checklist home screen 600 displayed by the touchscreen 112. Responsive to selection of the checklist button 512, the checklist application 303 moves to the checklist home screen 600. The checklist home screen 600 provides a plurality of buttons allowing for selection of various checklists and/or tasks. Shown are an opening checklist button 603, a closing checklist button 606, a food safety log button 609, a bathroom checks button 612, and a fridge monitor button 615. Although these five buttons 603, 606, 609, 612, and 615 are displayed, it is understood that the checklist home screen 600 may display any number of user interface elements allowing a user to select item(s) from a list. Also, checklist home screen 600 may include a return button 618 to enable a user to move to a screen showing the previous menu (e.g., to initial screen 500).

Figure 7:
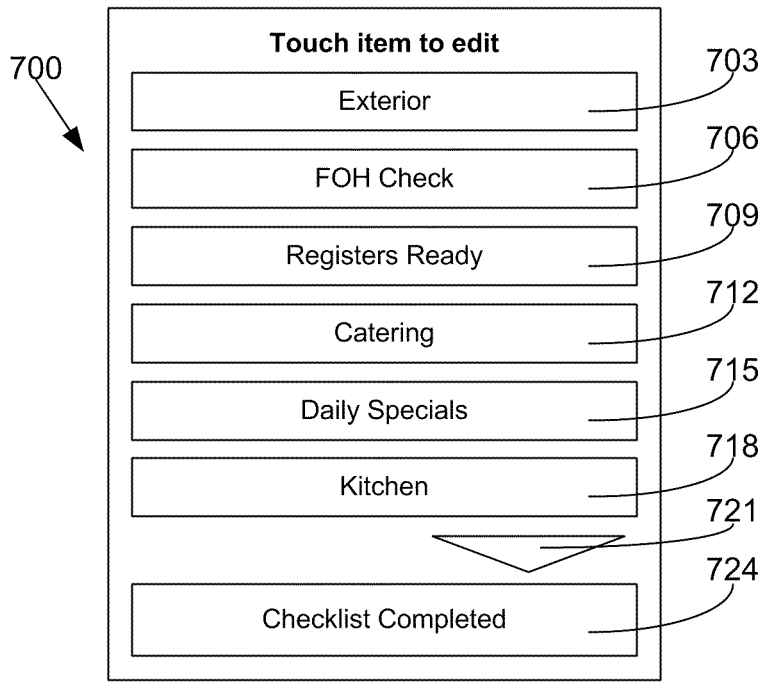

Once the user selects one of the buttons 603, 606, 609, 612, or 615, another screen is displayed on the touchscreen 112 as displayed in FIG. 6. In particular, FIG. 7 shows one example of an opening checklist screen 700 displayed in response to the user selecting the opening checklist button 603. User interface selection elements for tasks and/or checklists displayed on opening checklist screen 700 include an exterior checklist button 703, a front-of-house (FOH) checklist button 706, a registers ready checklist button 709, a catering checklist button 712, a daily specials checklist button 715, and a kitchen checklist button 718. Other user interface elements may be displayed relating to items on an opening checklist. Down button 721 enables a user to scroll down through a list of tasks or checklists beyond merely those displayed on the opening checklist screen 700. As a non-limiting example, a scroll bar may also be present in some embodiments to assist navigation. When a user has finished going through the required items on the checklist screen 700, the user may select the checklist completed button 724 to save the checklist and return to the previous menu.

Figure 8:
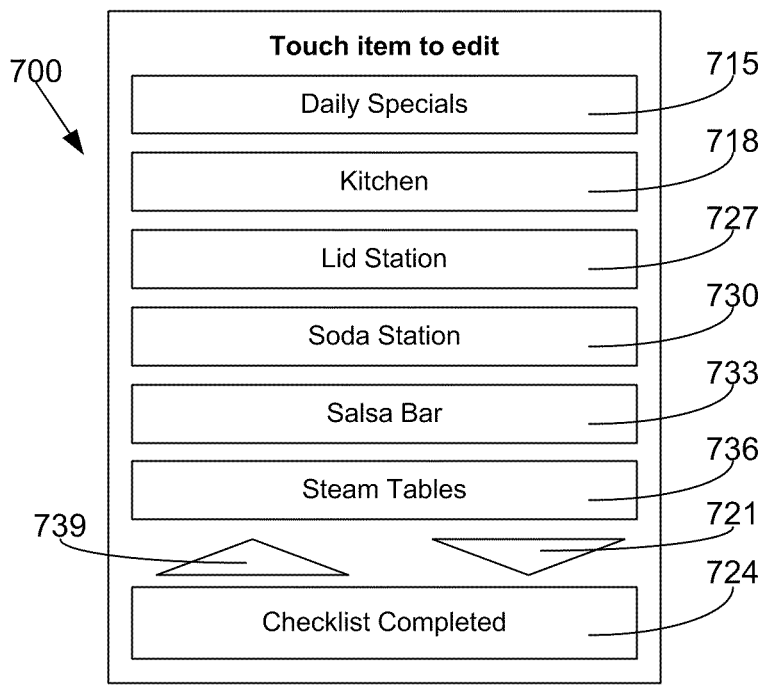

FIG. 8 shows a continuation of opening checklist screen 700. The daily specials checklist button 715 and the kitchen checklist button 718 are moved up in the display of the list, making room for a lid station checklist button 727, a soda station checklist button 730, a salsa bar checklist button 733, and a steam tables checklist button 736. Additionally, since several buttons have scrolled off the screen, now an up button 739 appears in FIG. 8, enabling a user to scroll upwards in the list.

Figure 9:
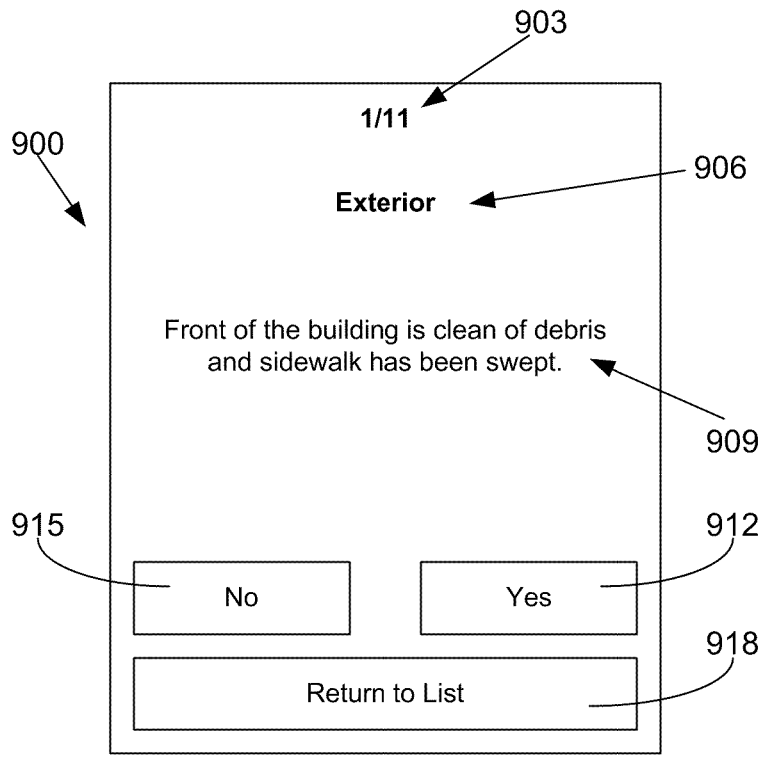

FIG. 9 provides an example of a task screen 900 displayed by the touchscreen 112. When a user selects, for example, exterior checklist button 703 (FIG. 7), task screen 900 appears. As a non-limiting example, task screen 900 includes a progress indicator 903, a title 906, a task description 909, a yes button 912, a no button 915, a return button 918, and/or potentially other user interface elements. The progress indicator 903 indicates the progress of the user in completing a particular checklist. The progress indicator 903 text, "1/11," indicates that task screen 900 is the first of eleven such task screens 900 in total that make up the exterior checklist. The title 906 indicates that task screen 900 is part of the exterior checklist. The task description 909 is a prompt for the user to perform a particular task such as verifying that the front of the building is clean of debris and that the sidewalk has been swept.

The type of task shown in task screen 900 is a yes/no completion-oriented task. Thus, after the task has been successfully performed, the user is to select the yes button 912. If the task could not be successfully performed, the user is to select the no button 915. The return button 918 is provided to enable a user to return to the previous list or menu. In one embodiment, if the user selects the return button 918 before completing all of the task items, the remaining task items may be marked "no" or otherwise incomplete. In one embodiment, currently unfinished task items are recorded as incomplete, and an indication of incomplete task items is sent to the server 124.

Figure 10:
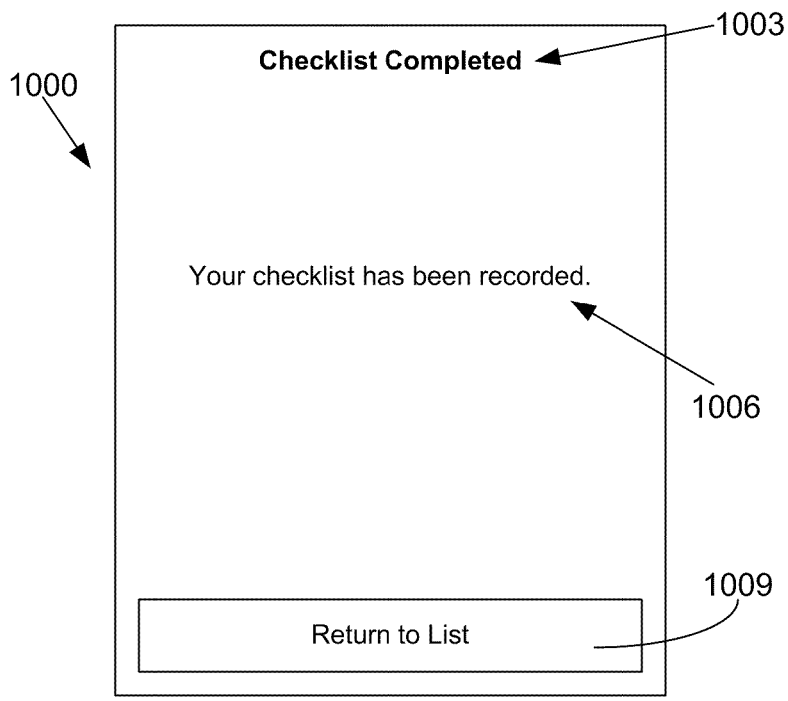

FIG. 10 illustrates an example of a checklist completed screen 1000 displayed by the touchscreen 112. As a non-limiting example, the checklist completed screen 1000 includes a title 1003, a description 1006, a return button 1009, and/or potentially other user interface elements. In one embodiment, after a particular checklist is completed and the responses associated with the checklist have been saved to checklist responses 312 (FIG. 3) on the handheld computing device 103 (FIG. 3), the checklist responses 312 may be immediately transferred to the server 124. Alternatively, the checklist responses 312 may be transferred after completion of all checklists in a set or after the user requests that the checklist responses 312 be transferred (e.g., by docking the handheld computing device 103 in the docking station 115 and selecting the button 130 (FIG. 1)).

Figure 11:
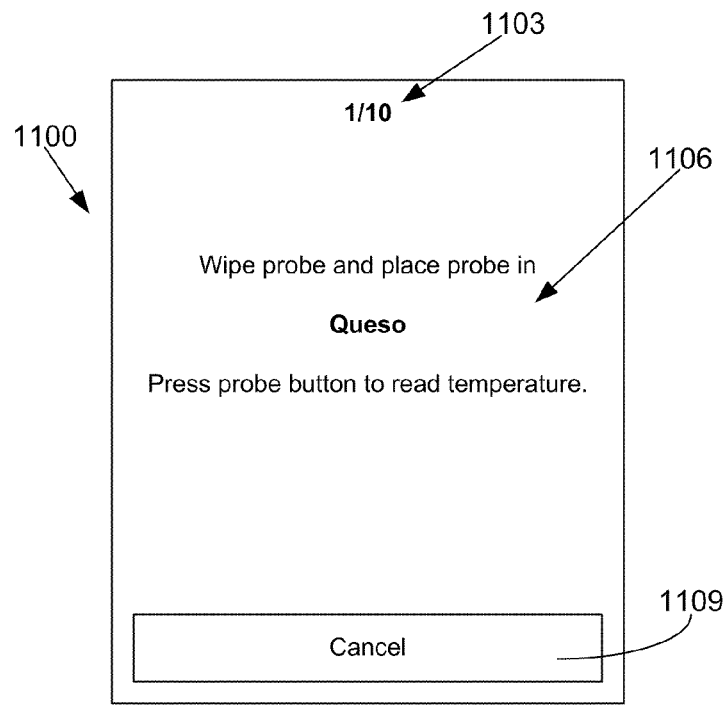

FIG. 11 provides an example of a task screen 1100 displayed by the touchscreen 112 that involves a data gathering task. In particular, task screen 1100 involves the use of a handheld temperature sensor 118 (FIG. 1). Task screen 1100, as a non-limiting example, includes a progress indicator 1103, a task description 1106, a cancel button 1109, and/or potentially other user interface elements. Here, task description 1106 directs the user to place the probe portion 139 (FIG. 1) of the handheld temperature sensor 118 into a food item (i.e., "Queso") and to press the trigger button 142 (FIG. 1) to read the temperature. When the trigger button 142 is pressed, the handheld temperature sensor 118 reads the temperature at the probe portion 139 and sends it to the handheld computing device 103 by wired or wireless data communication. In other embodiments, the handheld temperature sensor 118 may be configured to send the reading to the server 124, the docking station 115, or to some other intermediate device.

If the temperature reading taken during the performance of the task associated with task screen 1100 is outside of, or close to the boundary of, an acceptable range, the handheld computing device 103 may alarm or otherwise alert the user. For example, the task screen 1100 may turn red and flash, the handheld computing device 103 may vibrate or play a sound, and/or some other notification method may be employed.

A screen similar to task screen 1000 may be displayed when a user is to verify that the handheld computing device 103 has been at a particular location in the food service establishment. For example, the task description 1106 may prompt the user to scan, or otherwise record, an identifier 133 (FIG. 1) such as a barcode at a location, e.g., a restroom. To this end, the handheld computing device 103 may include a barcode scanner or other identifier recognition device. The checklist application 303 may then verify whether the correct identifier 133 was recorded and store the result in checklist responses 312. Such a procedure may be used to confirm that a task has been performed, beyond merely the "yes" or "no" response elicited, for example, in task screen 900. In other embodiments, handheld computing device 103 may incorporate Global Positioning System (GPS) capability or other capability such that the handheld computing device 103 may track its own movement within the food service establishment.

Figure 12:
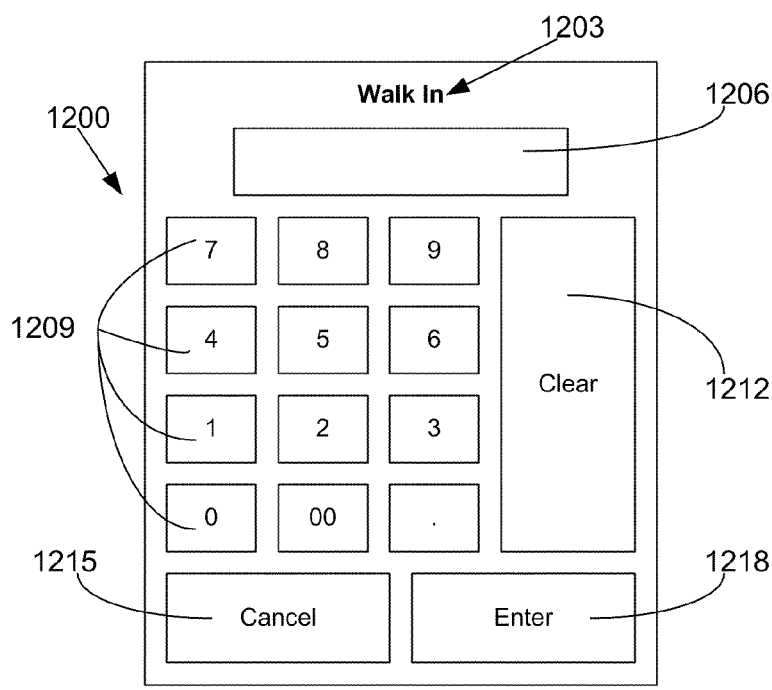

FIG. 12 shows an example of a data entry screen 1200 displayed by the touchscreen 112. Data entry screen 1200 is an example of how input may be gathered manually from a user. In this non-limiting example, data entry screen 1200 includes a title 1203, a display bar 1206, a plurality of input buttons 1209, a clear button 1212, a cancel button 1215, and an enter button 1218. In other embodiments, particularly for non-numeric data entry, other configurations of graphical user interface elements may be employed to facilitate manual data entry on touchscreen 112. Data entry screen 1200 may be employed, for example, to enter a temperature reading that is displayed on a device that does not automatically interface with the handheld computing device 103. In this embodiment, a number may be keyed in using the input buttons 1209. The keyed-in number is displayed in the display bar 1206. The clear button 1212 may be operable to clear the display bar 1206, for example, if an incorrect number was entered. The cancel button 1215 may be used to cancel this data entry task. The enter button 1218 may be used to save the data from the display bar 1206 and to move on to the next task or return to some other screen. In some cases, another value may be input into the system using data entry screen 1200 immediately after the entry of a number corresponding to one reading or task. The title 1203 may be updated to reflect the purpose or destination of the value.

With reference again to FIG. 3, after the employee user has completed the tasks of the checklist, or at least has attempted to complete the checklist, the checklist responses 312 stored on the handheld computing device 103 (FIG. 1) are sent to the server 124 (FIG. 1) to be stored in checklist responses 333. The checklist responses 312 include data entered on the touchscreen 112 of the handheld computing device 103, temperature data, humidity data, and/or other data measured by one or more stationary sensors 121, and food temperature data measured by one or more handheld temperature sensors 118. In various embodiments, the checklist responses 312 are timestamped and cannot be altered by the employee user while the checklist responses 312 are stored on the handheld computing device 103.

The sending of the checklist responses 312 may be automatic, or it may be manually triggered. As a non-limiting example, the user may indicate on the handheld computing device 103 that the checklist has been completed and should be sent to the server 124 (FIG. 1). As another non-limiting example, the user may return the handheld computing device 103 to the docking station 115 (FIG. 1) and indicate that a checklist has been completed by pressing the button 130 (FIG. 1). Accordingly, the handheld computing device 103 and docking station 115 may transfer the checklist responses 312 to the server 124.

Referring next to FIGS. 13-16, shown are examples of user interface screens of the web portal application 324 (FIG. 3) rendered in a client 157 (FIG. 1) according to various embodiments. According to one embodiment of the web portal application 324, the user interface screens of FIGS. 13-16 represent network pages generated by the web portal application 324 and rendered in a browser 345 (FIG. 3) of the client 157.

Figure 13:
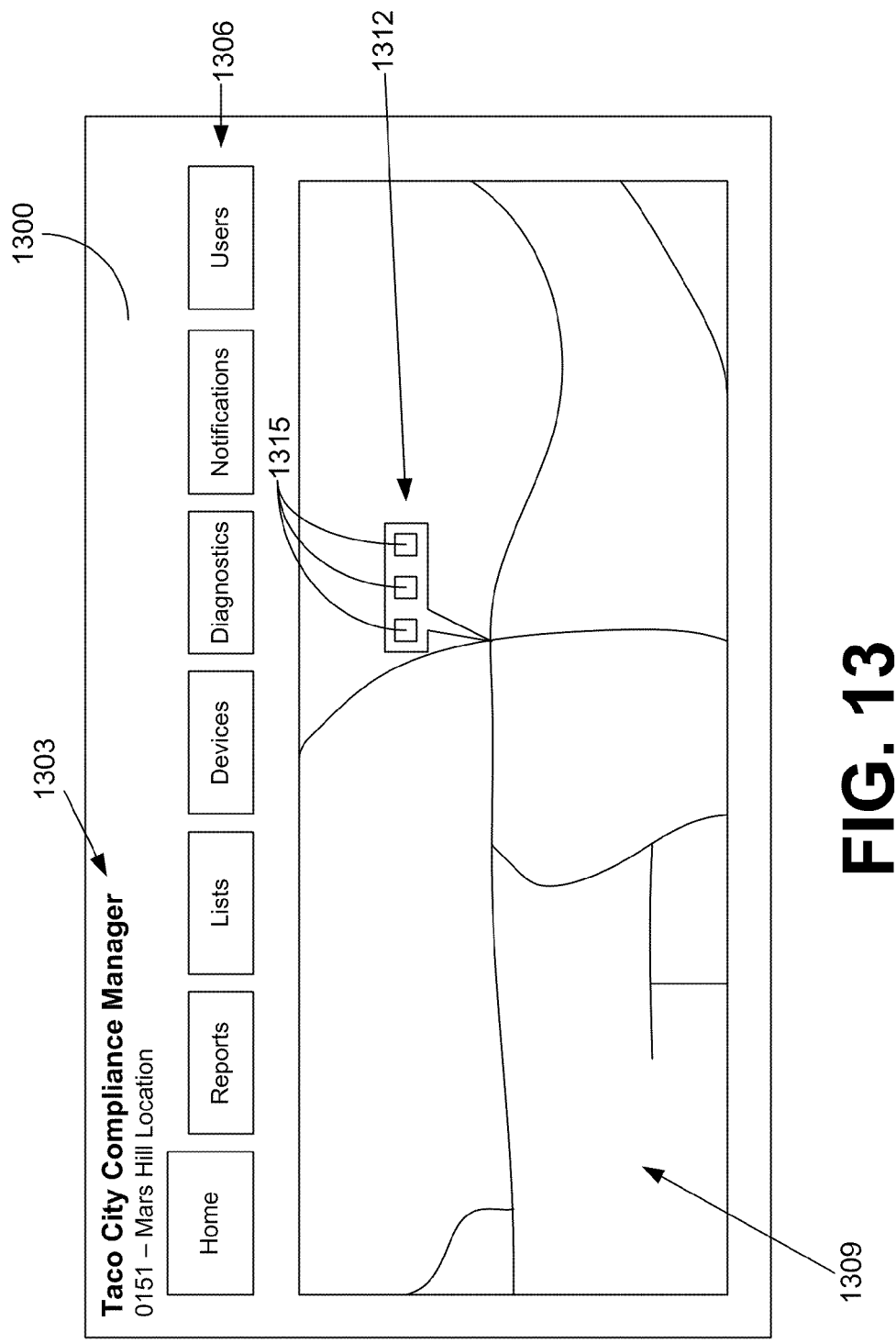
FIGS. 13-16 are examples of user interface screens of a web portal application rendered in a client in the food safety management system of FIG. 1 according to various embodiments of the present disclosure.

FIG. 13 illustrates one example of a home screen 1300 generated by the web portal application 324 and rendered in the browser 345. The home screen 1300 may include a title 1303, a menu 1306, a map 1309, one or more status indicators 1312, and/or other features. In the depicted embodiment, map 1309 displays a status indicator 1312 at or near a geographic location of each of one or more food service establishments. The map 1309 may have zoom and panning capabilities such that the geographic locations of other food service establishments may be depicted. The title 1303 relates to one food service establishment—"0151—Mars Hill Location"—but it is understood that the web portal application 324 may be used to manage multiple food service establishments. In such cases, multiple status indicators 1312 may be placed on map 1309, one at the geographic location of each food service establishment. The menu 1306 allows various other functions of the web portal application 324 to be accessed. In this embodiment, the menu 1306 also visually indicates which function is currently accessed, that is, the "Home" tab is enlarged.

Status indicators 1312 may each indicate a plurality of statuses 1315 for each food service establishment. The statuses 1315 may be color coded, pictorial, blinking, textual, and/or provide some other way for a user to ascertain visually the compliance status of the food service establishment. In one embodiment, three statuses 1315 are provided in each status indicator 1312, the statuses 1315 respectively representing diagnostic data, automatically gathered checklist responses 312, and manually gathered checklist responses 312. In one embodiment, the statuses 1315 are color coded so that green represents active (e.g., data gathered within the last 24 hours), yellow represents some activity (e.g., data gathered within the last 72 hours), and red represents inactive (e.g., no data gathered within the last 72 hours).

Figure 14:
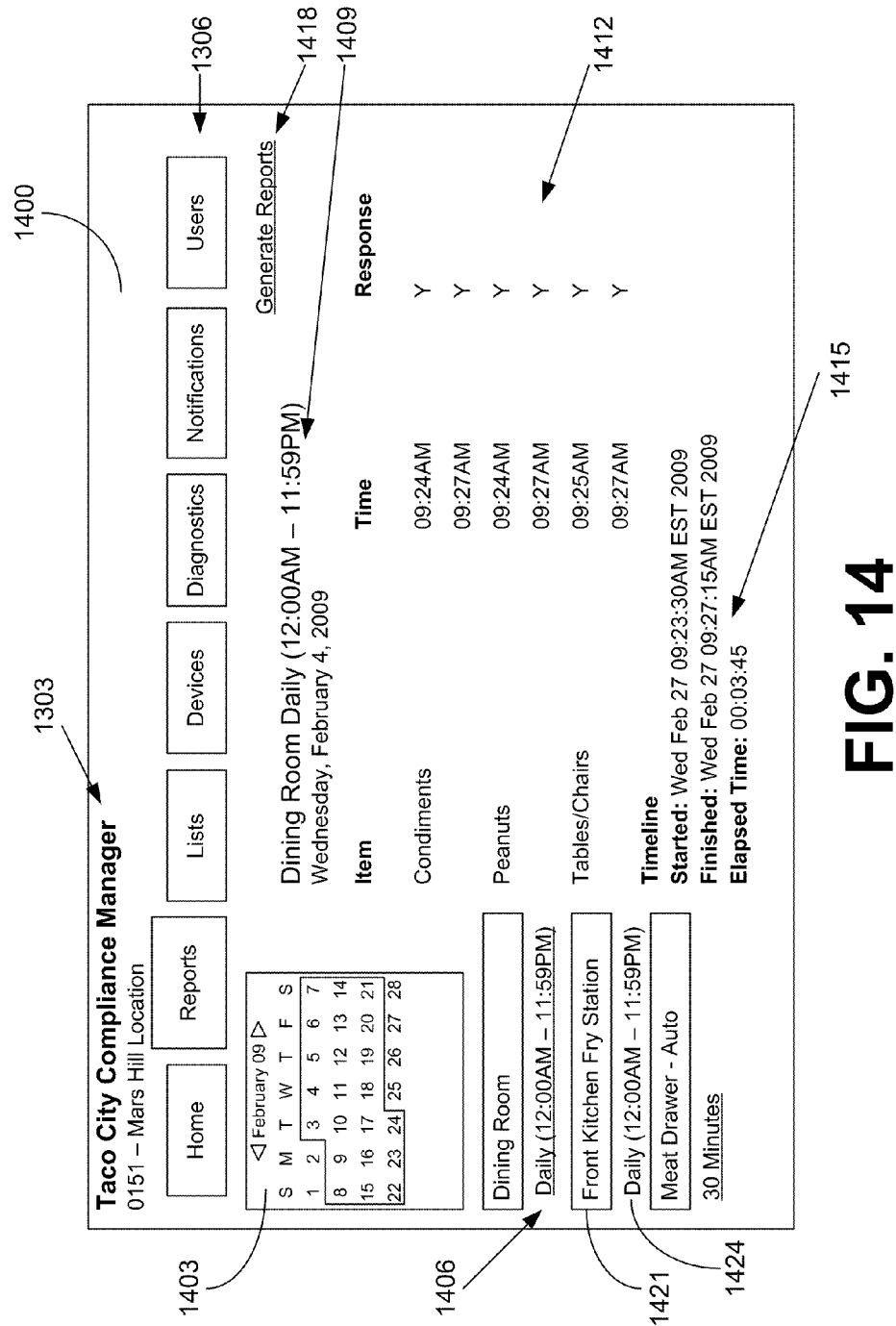

FIG. 14 shows one example of a report screen 1400 generated by the web portal application 324 and rendered in the browser 345. The report screen 1400 may include a title 1303, a menu 1306, a calendar 1403, a list of checklists 1406, a selected checklist title 1409, selected checklist results 1412, a selected checklist timeline 1415, a generate reports function 1418, and/or other features. The calendar 1403 may display the current month or some other selected time period. The calendar 1403 may allow the checklists for a day or other period to be viewed. To this end, a number corresponding to a day on the calendar may be selectable so that a new report screen 1400 adapted to that day is provided by the web portal application 324. The calendar 1403 may also visually indicate days or other time periods for which data has been collected.

The list of checklists 1406 provides access to each of the checklists for a particular food service establishment or group of food service establishments for the selected time period. The list of checklists 1406 may include a checklist name 1421 and one or more checklist intervals 1424 for each checklist. In various embodiments, the checklist intervals 1424 may be used to select a particular checklist, or aggregation of checklists from a time period, to display on the report screen 1400 (e.g., by clicking on a particular checklist interval 1424). In various embodiments, the checklist name 1421 may also be used to select a particular checklist, or aggregation of checklists from a time period, to display on the report screen 1400. In one embodiment, a checklist interval 1424 and/or checklist name 1421 may be selectable only when data has been received for the selected time period.

The selected checklist title 1409 may describe the current checklist rendered in the selected checklist results 1412, including the name of the checklist, the time interval of the checklist, the day and/or other time period associated with the selected checklist results 1412, and/or other descriptive text. The selected checklist results 1412 may include each of the task items, the timestamp associated with performance of the task, the result of the task, and/or other information. In the depicted embodiment, the performances of each respective task are grouped together where there are multiple performances. In other embodiments, the task performances may be arranged chronologically or in some other grouping or order. Where the task performances are numeric readings, the selected checklist results 1412 may include a graph or chart of the numeric readings.

Also rendered may be a selected checklist timeline 1415, providing time-related information relating to the completion of the selected checklist results 1412. As a non-limiting example, the selected checklist timeline 1415 may include a time when the checklist was started, a time when the checklist was finished, an elapsed time, and other time-related information.

Figure 15:
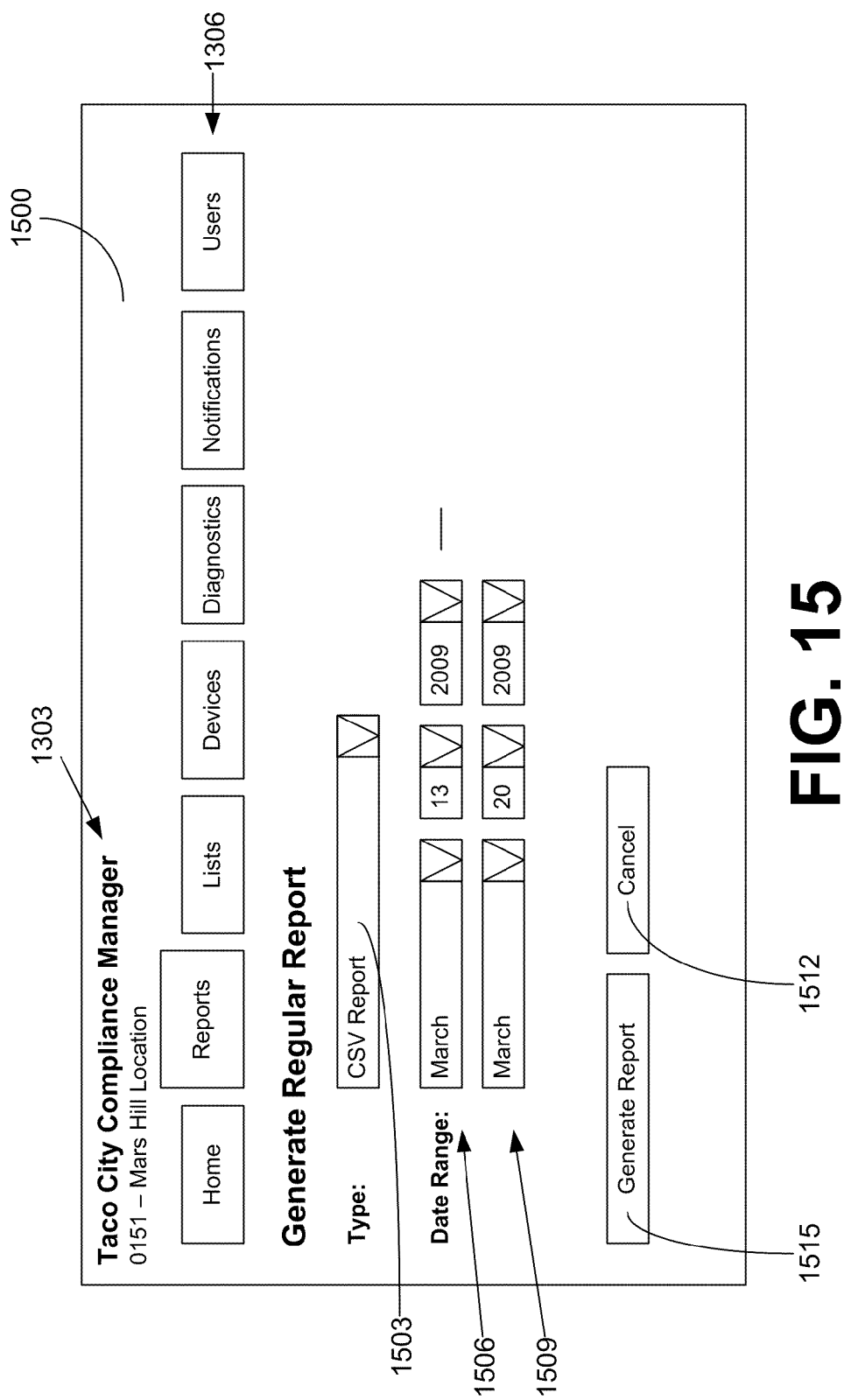

The report screen 1400 may also include a generate reports function 1418 that, when selected, enables a user to specify parameters for generating a custom report for one or more food service establishments based on the checklist responses 333. FIG. 15 provides an example of a generate reports screen 1500 generated by the web portal application 324 and rendered in the browser 345. The generate reports screen 1500 may include a report type input means 1503, a starting date input means 1506, a ending date input means

1509, a cancel button 1512, a generate report button 1515, and/or other user interface elements.

The report type input means 1503 may be used to select among several report types, for example, comma-separated value (CSV) report, portable document format (PDF) anomaly report, PDF scorecard report, a time and temperature log, and/or other report types. The CSV report produces a file that can be read in any text program and can be imported into other applications. The PDF anomaly report produces a PDF file that reflects any odd readings or other unexpected results in the data collected during a specified period. The PDF scorecard report shows how many of each of the tasks on each checklist were completed within the specified period. The report type input means 1503 may include any type of input means, for example, a drop-down box, set of radio buttons, checkboxes, text field, etc.

The starting date input means 1506 and the ending date input means 1509 may be used to provide starting and ending dates and/or times for the report. The starting date input means 1506 and the ending date input means 1509 may include any type and number of input means, for example, a calendar, a drop-down box, set of radio buttons, checkboxes, text field, etc. The cancel button 1512 may be used to return to the report screen 1400 without generating a report. The generate report button 1515 may be used to provide the input parameters from the client 157 to the server 124 in order for the web portal application 324 to generate the desired report.

Figure 16:
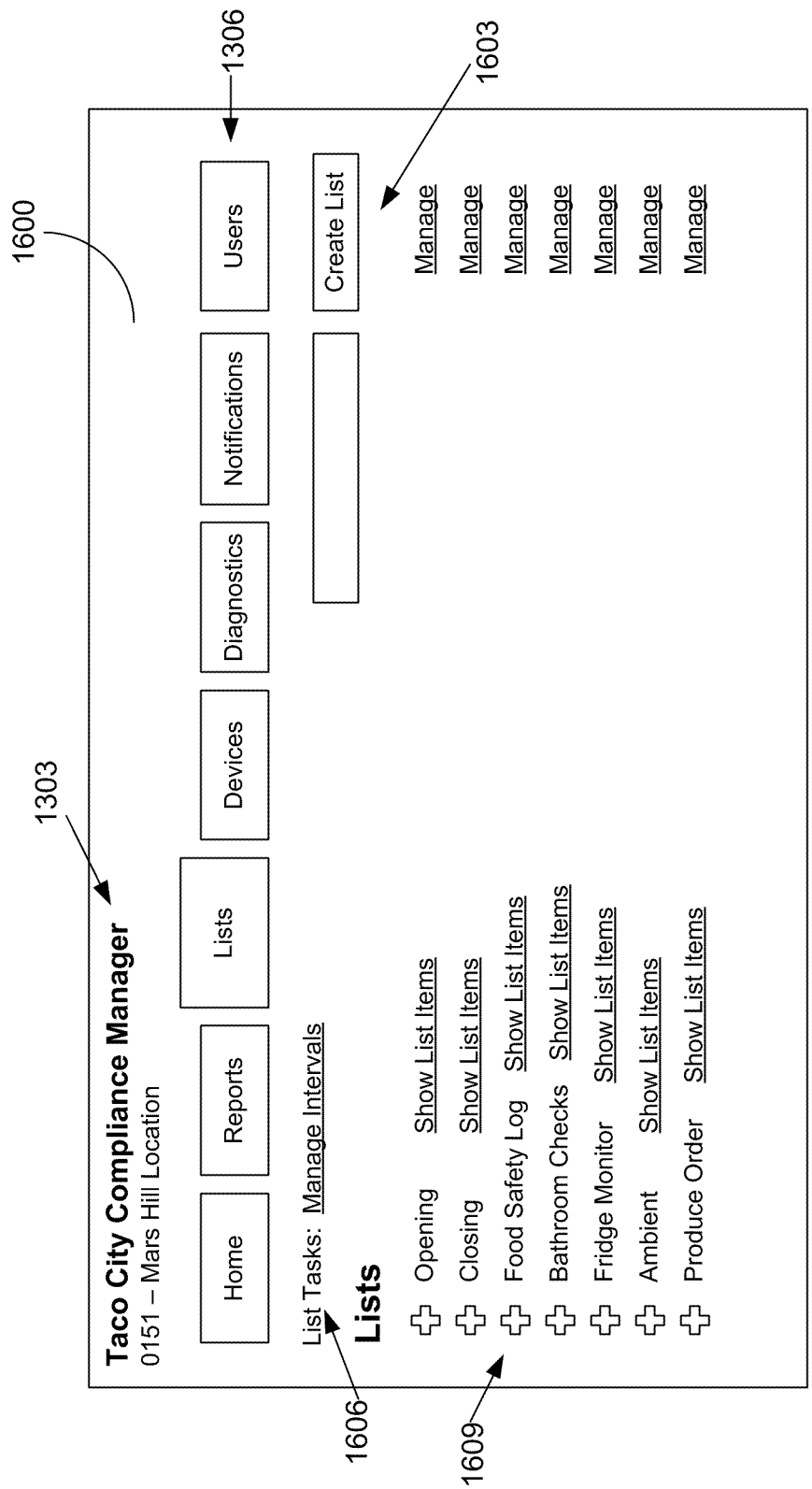

FIG. 16 illustrates one example of a checklist management screen 1600 generated by the web portal application 324 and rendered in the browser 345. List management screen 1600 may include, for example, a title 1303, a menu 1306, a list creation means 1603, one or more list tasks 1606, a listing of checklists 1609, and/or potentially other user interface elements. List creation means 1603 permits a user to create a checklist having a given title. List creation means 1603 may include, for example, a text field, a button, and/or other input elements. List tasks 1606 may include, for example, a manage intervals task to permit a user to define and/or change time intervals at which a task or checklist is to be performed. In various embodiments, the checklist management screen 1600 allows a user to sort checklists or tasks within a checklist.

The listing of checklists 1609 allows a user to view the checklists that have been defined for one or more food service establishments. As depicted, a title may be displayed for each checklist initially, with a button and/or other mechanism operable to expand a checklist into subchecklists and/or individual tasks. In other embodiments, the entire set of checklists and tasks may be initially displayed. A user may be able to select a checklist to manage the checklist, for example, to define tasks or subchecklists for the selected checklist. When creating a checklist, a user may define an interval for the checklist. The interval may be specifically defined for the checklist or may be one of a number of configurable interval groups specifying one or more intervals that may be referenced in multiple checklists.

A task may be defined within a checklist as one of several types. Different types of tasks may include, but are not limited to, Boolean tasks, temperature tasks, manual temperature tasks, numeric data entry tasks, passive temperature tasks, automatic temperature tasks, and other tasks. A Boolean task is one that involves a yes or no selection to show completion of the task. A temperature task is one that may have a numeric value to represent the temperature at a station taken with the handheld temperature sensor 118. A minimum and maximum value in range may be supplied so that if the recorded temperature is out of range, the user may be alerted. A manual temperature task is one in which a temperature is recorded using a numeric keypad such as that of data entry screen 1200 (FIG. 12). A numeric data entry task is one that uses a specific numeric input other than one for temperature, e.g., a number of cases of products to be ordered.

A passive temperature task is one that may be monitored without any specific interaction from an employee user or the handheld computing device 103. A passive temperature task may alert the system when the temperature readings go above or below a preset range of temperature. An automatic temperature task is one that may be recorded without any specific interaction from the employee user or the handheld computing device 103. An automatic temperature task may be set up to transmit at programmed intervals during a day or other timer period. Depending on the type of tasks, a task may be associated with one or more ranges for acceptability, non-acceptability, etc.

Menu 1306 may also provide selection for device management, diagnostics, notification management, user management, and/or other functions. The notification management function may allow a task to be associated with a notification. A notification may be triggered based on completion of the task, non-completion of the task, anomaly of the response of the task, and/or other events. One or more users may be notified by way of, for example, text message, phone call, email, and/or other communication methods. Which users are notified may be configurable for the task, checklist, food service establishment, etc.

The user management function may allow configuration of accounts for users of the web portal application 324 and/or the checklist application 303 (FIG. 3). Privileges may be defined for users to allow them to manage particular food service establishments, view reports, define checklists, and/or perform other management tasks. Contact information may also be supplied for users to enable sending of notifications to the users. As discussed in connection with FIG. 4, in various embodiments there may be a hierarchy of multiple privilege levels for users.

Figure 17:
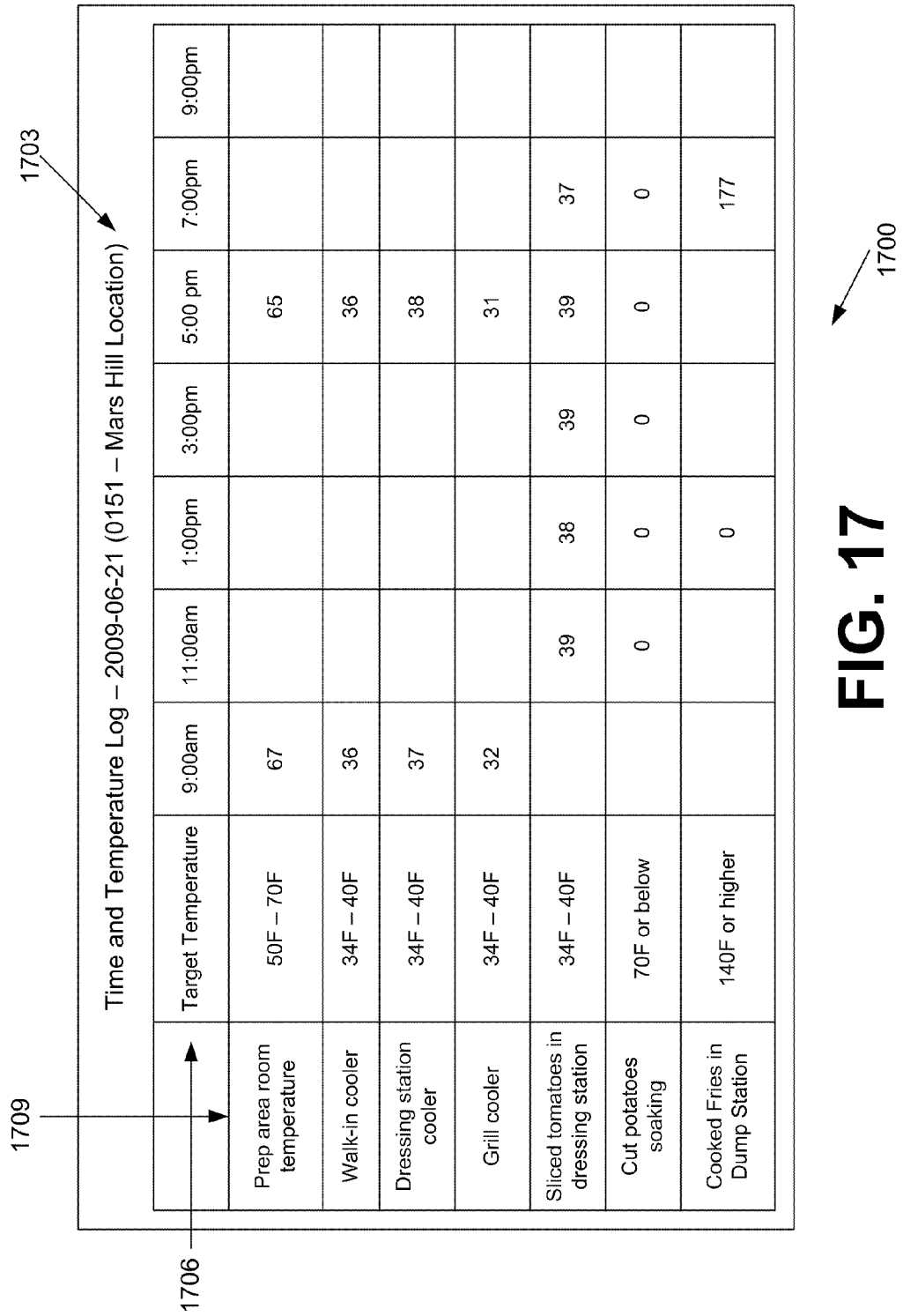
FIG. 17 is an example of a customized time and temperature log that may be generated by a web portal application executed in a server in the food safety management system of FIG. 1 according to various embodiments of the present disclosure.

Moving now to FIG. 17, shown is an example of a customized time and temperature log 1700 that may be generated by the web portal application 324 (FIG. 3) in various embodiments. The customized time and temperature log 1700 may be generated, for example, through the generate reports function illustrated by FIG. 15. The customized time and temperature log 1700 may be viewed in the browser 345 (FIG. 1) or some other application executing in the client 157 (FIG. 1) and/or printed in various embodiments.

The customized time and temperature log 1700 may be, for example, in a grid arrangement. The customized time and temperature log 1700 may include a title 1703, a first axis 1706, a second axis 1709, and/or other features. In the illustrated embodiment, the first axis 1706 includes a target temperature and a plurality of times at which the checklist tasks are to be performed. In the illustrated embodiment, the second axis 1709 includes a plurality of checklist tasks. As shown, a temperature reading or range definition may be provided at the intersection of the first axis 1706 and the second axis 1709. Absence of data may signify that the user was not to perform that task at that time. Zeros or other out of range indications may show that the task was not performed, that the equipment was malfunctioning, that the task was performed improperly, etc. The customized time and temperature log 1700 may include a plurality of regions for future temperature data, future food temperature data, future humidity data, and/or other data yet to be collected.

Figure 18:
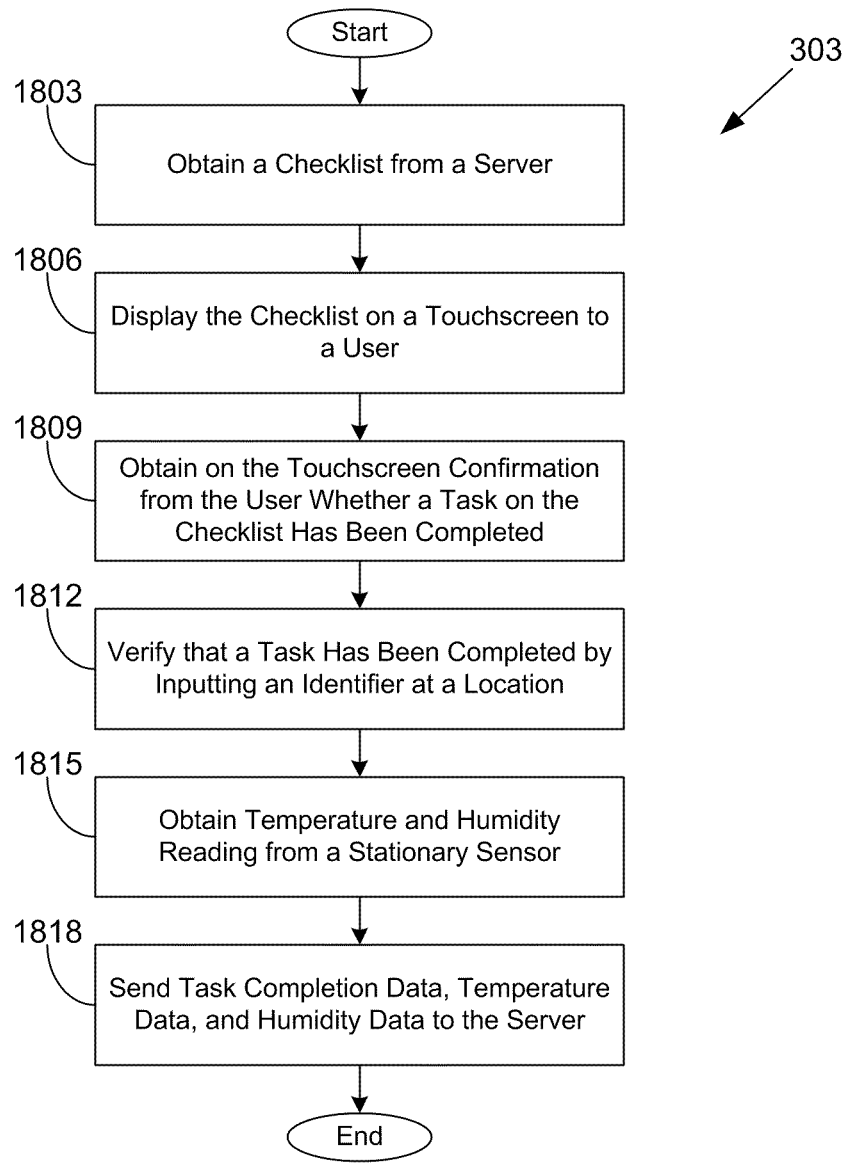
FIG. 18 depicts a flowchart that illustrates one example of functionality implemented in a checklist application executed in a handheld computing device in the food safety management system of FIG. 1 according to various embodiments of the present disclosure.

Turning now to FIG. 18, shown is a flowchart that provides one example of the operation of the checklist application 303 (FIG. 32) according to various embodiments. It is understood that the flowchart of FIG. 18 provides merely an example of the many different types of functional arrangements that may be employed to implement the operation of the checklist application 303 as described herein. As an alternative, the flowchart of FIG. 18 may be viewed as depicting an example of steps of a method implemented in the handheld computing device 103 (FIG. 1) according to one or more embodiments.

Beginning with box 1803, the checklist application 303 obtains a checklist from the server 124 (FIG. 1) for a food service establishment. The checklist may include a plurality of tasks to be performed in the food service establishment. The checklist may be stored in the checklist definitions 309 (FIG. 3) within the data store 306 (FIG. 3) of the handheld computing device 103. In box 1806, the checklist is displayed by the checklist application 303 on a touchscreen 112 (FIG. 1) of the handheld computing device 103 to the user. The display may be in response to some input provided by the user on the touchscreen 112 or may be performed automatically when the handheld computing device is removed from the docking station 115 (FIG. 1).

In box 1809, the checklist application 303 obtains, by way of the touchscreen 112, confirmation from the user whether a task on the checklist has been completed. Next, in box 1812, the checklist application 303 verifies that a task has been completed by inputting an identifier at a location in the food service establishment. For example, the handheld computing device 103 may scan a barcode in a restroom area to verify that the handheld computing device 103 has been in the restroom area. Then, in box 1815, temperature and/or humidity readings are obtained from one or more stationary sensors 121 (FIG. 1) monitoring a food storage environment. Additionally, temperature readings may be obtained from one or more handheld temperature sensors 118 (FIG. 1) inserted into a food item or food preparation item.

Next, in box 1818, the checklist application 303 sends the task completion data, temperature data, and/or humidity data to the server 124 by way of a direct network connection to network 127 (FIG. 1) or through the docking station 115. The checklist application 303 then ends.

Figure 19:
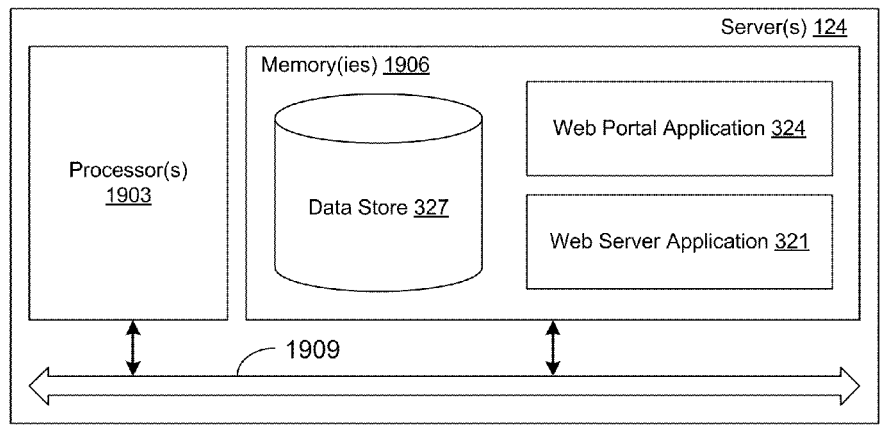
FIG. 19 is a schematic block diagram that provides one example illustration of a server employed in the food safety management system of FIG. 1 according to various embodiments of the present disclosure.

Referring next to FIG. 19, shown is a schematic block diagram of the server 124 (FIG. 1) according to an embodiment of the present disclosure. The server 124 includes a processor circuit, for example, having a processor 1903 and a memory 1906, both of which are coupled to a local interface 1909. To this end, the server 124 may include, for example, a server computer or like device. The local interface 1909 may include, for example, a data bus with an accompanying address/control bus or other bus structure as can be appreciated.

Stored in the memory 1906 are both data and several components that are executable by the processor 1903. In particular, stored in the memory 1906 and executable by the processor 1903 are a web server application 321 (FIG. 3), a web portal application 324 (FIG. 3) and potentially other applications. Also stored in the memory 1906 may be a data store 327 (FIG. 3) and other data. In addition, a server operating system may be stored in the memory 1906 and executable by the processor 1903.

Figure 20:
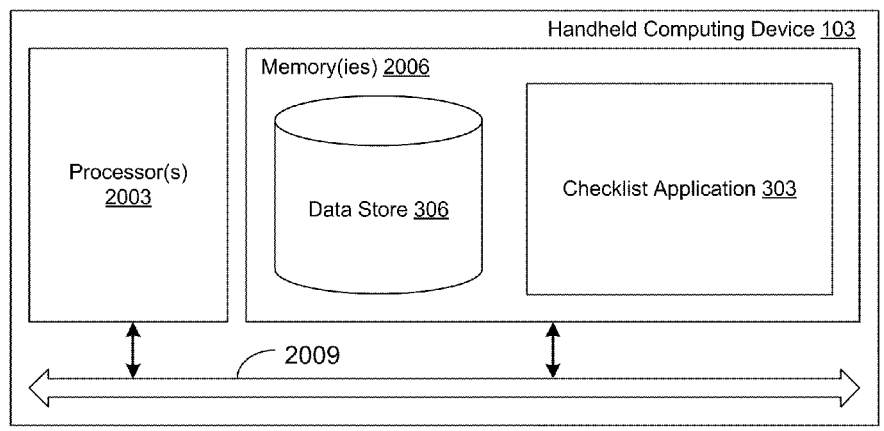
FIG. 20 is a schematic block diagram that provides one example illustration of a handheld computing device employed in the food safety management system of FIG. 1 according to various embodiments of the present disclosure.

With reference to FIG. 20, shown is a schematic block diagram of the handheld computing device 103 (FIG. 1) according to an embodiment of the present disclosure. The handheld computing device 103 includes a processor circuit, for example, having a processor 2003 and a memory 2006, both of which are coupled to a local interface 2009. The local interface 2009 may include, for example, a data bus with an accompanying address/control bus or other bus structure as can be appreciated.

Stored in the memory 2006 are both data and several components that are executable by the processor 2003. In particular, stored in the memory 2006 and executable by the processor 2003 are a checklist application 303 (FIG. 3) and potentially other applications. Also stored in the memory 2006 may be a data store 306 (FIG. 3) and other data. In addition, an operating system may be stored in the memory 2006 and executable by the processor 2003.

With reference now to both FIGS. 19 and 20, it is understood that there may be other applications that are stored in the memory 1906, 2006 and are executable by the processors 1903, 2003 as can be appreciated. Where any component discussed herein is implemented in the form of software, any one of a number of programming languages may be employed such as, for example, C, C++, C#, Java, Java Script, Perl, Python, Flash, PHP, Ruby, or other programming languages.

A number of software components are stored in the memory 1906, 2006 and are executable by the processor 1903, 2003. In this respect, the term "executable" means a program file that is in a form that can ultimately be run by the processor 1903, 2003. Examples of executable programs may be, for example, a compiled program that can be translated into machine code in a format that can be loaded into a random access portion of the memory 1906, 2006 and run by the processor 1903, 2003, source code that may be expressed in proper format such as object code that is capable of being loaded into a random access portion of the memory 1906, 2006 and executed by the processor 1903, 2003, or source code that may be interpreted by another executable program to generate instructions in a random access portion of the memory 1906, 2006 to be executed by the processor 1903, 2003, etc. An executable program may be stored in any portion or component of the memory 1906, 2006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1906, 2006 is defined herein as including both volatile and nonvolatile memory and data storage components. Volatile components are those that do not retain data values upon loss of power. Nonvolatile components are those that retain data upon a loss of power. Thus, the memory 1906, 2006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 1903, 2003 may represent multiple processors and the memory 1906, 2006 may represent multiple memories that operate in parallel processing circuits, respectively. In such a case, the local interface 1909, 2009 may be an appropriate network that facilitates communication between any two of the multiple processors 1903, 2003, between any processor 1903, 2003 and any of the memories 1906, 2006, or between any two of the memories 1906, 2006, etc. The local interface 1909 may include additional systems designed to coordinate this communication, including, for example, performing load balancing. The processor 1903, 2003 may be of electrical or of some other available construction.

Although the web server application 321, web portal application 324, checklist application 303, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 18 shows the functionality and operation of an implementation of portions of the checklist application 303. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 18 shows a specific order of execution, it is understood that the order of execution may differ from that which is depicted. For example, the order of execution of two or more blocks may be scrambled relative to the order shown. Also, two or more blocks shown in succession in FIG. 18 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the web server application 321, web portal application 324, and checklist application 303, that includes software or code can be embodied in any computer-readable medium for use by or in connection with an instruction execution system such as, for example, a processor in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer readable medium can include any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device comprising a processor and a memory;
   a handheld computing device at each one of a plurality of food service establishments; and
   a web portal application executable in the at least one computing device, wherein when executed the web portal application causes the at least one computing device to at least:
   generate a checklist for each one of the food service establishments, each checklist including a plurality of tasks to be performed at the respective one of the food service establishments;
   customize a subset of the checklists for a respective subset of the food service establishments, the subset of the checklists having at least one task in common being customized;
   send each checklist to the handheld computing device at the respective one of the food service establishments;
   obtain a plurality of responses to each checklist from the handheld computing device at each respective one of the food service establishments, the responses including data entered on a touchscreen of the handheld computing device, temperature data measured by at least one stationary sensor, and food temperature data measured by at least one handheld temperature sensor;
   generate at least one network page summarizing the responses to the checklist for at least one of the food service establishments; and
   generate a report for each food service establishment including at least the respective temperature data and respective food temperature data for a time interval, wherein the time interval has not been completed and the report includes a plurality of regions for future temperature data and future food temperature data.

2. The system of claim 1, wherein the report is arranged in a grid according to time.

3. The system of claim 1, wherein each handheld computing device is configured to communicate wirelessly with the at least one stationary sensor and the at least one handheld temperature sensor at the respective food service establishment.

4. A system, comprising:
at least one computing device comprising a processor and a memory;
a handheld computing device at each one of a plurality of food service establishments; and
a web portal application executable in the at least one computing device, wherein when executed the web portal application causes the at least one computing device to at least:
generate a checklist for each one of the food service establishments, each checklist including a plurality of tasks to be performed at the respective one of the food service establishments;
customize a subset of the checklists for a respective subset of the food service establishments, the subset of the checklists having at least one task in common being customized;
send each checklist to the handheld computing device at the respective one of the food service establishments;
obtain a plurality of responses to each checklist from the handheld computing device at each respective one of the food service establishments, the responses including data entered on a touchscreen of the handheld computing device, temperature data measured by at least one stationary sensor, and food temperature data measured by at least one handheld temperature sensor, wherein the at least one stationary sensor comprises:
a base unit configured to communicate wirelessly with the handheld computing device; and
a plurality of sensors placed inside a food storage apparatus having a cabinet and a door;
wherein the sensors are connected to the base unit by at least one cable disposed under a surface of a gasket of the door, the cable being substantially flat so as to permit the surface of the gasket to seal against the cable and a surface of the cabinet without an air gap; and
generate at least one network page summarizing the responses to the checklist for at least one of the food service establishments.

5. The system of claim 1, wherein the responses further include a verification that the handheld computing device was at a location in the respective food service establishment.

6. The system of claim 5, wherein the verification comprises an input of an identifier at the location by the handheld computing device.

7. The system of claim 6, wherein the input of the identifier comprises a scan of a barcode.

8. The system of claim 1, wherein the responses further include humidity data measured by the at least one stationary sensor.

9. A system, comprising:
at least one computing device comprising a processor and a memory;
a handheld computing device at each one of a plurality of food service establishments; and
a web portal application executable in the at least one computing device, wherein when executed the web portal application causes the at least one computing device to at least:
generate a checklist for each one of the food service establishments, each checklist including a plurality of tasks to be performed at the respective one of the food service establishments;
customize a subset of the checklists for a respective subset of the food service establishments, the subset of the checklists having at least one task in common being customized;
send each checklist to the handheld computing device at the respective one of the food service establishments;
obtain a plurality of responses to each checklist from the handheld computing device at each respective one of the food service establishments, the responses including data entered on a touchscreen of the handheld computing device, temperature data measured by at least one stationary sensor, and food temperature data measured by at least one handheld temperature sensor, and the responses further include humidity data measured by at least one stationary sensor and at least one effective cooling quotient based at least in part on the temperature data and the humidity data.

10. A system, comprising:
a handheld computing device including a touchscreen; and
a checklist application executable in the handheld computing device, wherein when executed the checklist application causes the handheld computing device to at least:
obtain a checklist from at least one server, the checklist including a plurality of tasks to be performed in a food service establishment;
display the checklist on the touchscreen to a user and obtain confirmation on the touchscreen from the user whether at least one of the tasks has been completed;
verify that at least one of the tasks has been completed by scanning an identifier that is present at a specific location in the food service establishment;
obtain at least one temperature reading from a handheld temperature sensor having a probe inserted into a food item at the food service establishment responsive to at least one of the tasks;
send task completion data and food temperature data from the handheld computing device to the at least one server; and
calculate an effective cooling quotient based at least in part on at least one temperature reading and at least one humidity reading obtained from at least one stationary sensor monitoring a food storage environment.

11. The system of claim 10, wherein when executed the checklist application further causes the handheld computing device to at least rotate display of an interface on the touchscreen responsive to an indication that the user is left-handed or right-handed.

12. The system of claim 10, wherein when executed the checklist application further causes the handheld computing device to at least display the tasks in one of a plurality of languages responsive to an indication of a language preference of the user.

13. The system of claim 10, wherein when executed the checklist application further causes the handheld computing device to at least alert the user when the at least one temperature reading for the food item meets a threshold.

14. The system of claim 10, wherein the identifier comprises a barcode and the handheld computing device further includes a barcode scanner.

15. The system of claim 10, further comprising a base station configured to receive and supply power to the handheld computing device and including a button to initiate sending of data from the handheld computing device to the at least one server.

16. The system of claim 10, wherein the at least one stationary sensor comprises:
- a base unit configured to communicate wirelessly with the handheld computing device; and
- a plurality of sensors placed inside a food storage apparatus having a cabinet and a door;
- wherein the sensors are connected to the base unit by at least one cable disposed under a surface of a gasket of the door, the cable being substantially flat so as to permit the surface of the gasket to seal against the cable and a surface of the cabinet without an air gap.

17. The system of claim 4, wherein the responses further include humidity data measured by the at least one stationary sensor.

18. The system of claim 17, wherein the responses further include at least one effective cooling quotient based at least in part on the temperature data and the humidity data.

19. The system of claim 1, wherein when executed the web portal application further causes the at least one computing device to at least generate a map displaying a status indicator at a geographic location of each of at least one of the food service establishments, the status indicator selected based at least in part on the responses associated with the respective food service establishment.

20. The system of claim 1, wherein when executed the web portal application further causes the at least one computing device to at least generate a report for each food service establishment including at least the respective temperature data and respective food temperature data for a time interval.

* * * * *

UNITED STATES PATENT AND TRADEMARK OFFICE
CERTIFICATE OF CORRECTION

PATENT NO. : 9,811,788 B2
APPLICATION NO. : 12/496004
DATED : November 7, 2017
INVENTOR(S) : Douglas Brown Dillard et al.

It is certified that error appears in the above-identified patent and that said Letters Patent is hereby corrected as shown below:

On the Title Page

Item "(75) INVENTORS"
Please add inventor Adam Parrott, Savannah, GA (US)

Signed and Sealed this
Twenty-first Day of November, 2023

Katherine Kelly Vidal
Director of the United States Patent and Trademark Office